US008990102B1

(12) United States Patent
Mowry

(10) Patent No.: US 8,990,102 B1
(45) Date of Patent: *Mar. 24, 2015

(54) METHOD AND SYSTEM FOR COMPILING A CONSUMER-BASED ELECTRONIC DATABASE, SEARCHABLE ACCORDING TO INDIVIDUAL INTERNET USER-DEFINED MICRO-DEMOGRAPHICS

(75) Inventor: Craig Mowry, Southampton, NY (US)

(73) Assignee: Home Producers Network, LLC, Southampton, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 12/791,564

(22) Filed: Jun. 1, 2010

Related U.S. Application Data

(63) Continuation of application No. 12/707,363, filed on Feb. 17, 2010, now Pat. No. 8,249,924, which is a continuation of application No. 09/808,538, filed on Mar. 14, 2001, now Pat. No. 7,720,707, which is a
(Continued)

(51) Int. Cl.
G06Q 30/00 (2012.01)
G06Q 30/02 (2012.01)

(52) U.S. Cl.
CPC .................................... G06Q 30/02 (2013.01)
USPC ......................................................... 705/14

(58) Field of Classification Search
CPC ..................................................... G06Q 30/02
See application file for complete search history.

(56) References Cited

U.S. PATENT DOCUMENTS

| 5,041,972 A | 8/1991 | Frost |
| 5,661,516 A | 8/1997 | Carles |
| 5,717,923 A | 2/1998 | Dedrick |
| 5,724,424 A | 3/1998 | Gifford |
| 5,754,939 A | 5/1998 | Herz et al. |

(Continued)

FOREIGN PATENT DOCUMENTS

| AU | 2002357397 | 7/2003 |
| AU | 2003293160 | 11/2003 |

(Continued)

OTHER PUBLICATIONS

Cirit, et al., "Consumer Profiling Using Fuzzy Query and Social Network Techniques," 6 pages, 2005.
(Continued)

*Primary Examiner* — Arthur Duran
(74) *Attorney, Agent, or Firm* — Leason Ellis LLP

(57) ABSTRACT

A system and method includes storing user information, advertiser information and electronic user interest information including one or more of questions and factual information regarding a plurality of topics. A request for information is received from a first user computing device, and at least one relevance factor is determined, based on at least a relationship of the electronic request for information with one or more of the user information, the advertiser information and the user interest information. A likelihood of receiving electronic information from the first user computing device is determined and at least some advertiser information is selected, based on at least the at least one relevance factor. First electronic user interest information is selected and a transmission including the first electronic user interest information and the at least some electronic advertiser information is generated and transmitted to the first user computing device.

21 Claims, 20 Drawing Sheets

Related U.S. Application Data continuation-in-part of application No. 09/756,581, filed on Jan. 8, 2001, now abandoned.

(60) Provisional application No. 60/175,093, filed on Jan. 7, 2000, provisional application No. 60/176,440, filed on Jan. 14, 2000, provisional application No. 60/189,060, filed on Mar. 14, 2000, provisional application No. 60/212,663, filed on Jun. 20, 2000, provisional application No. 60/226,672, filed on Aug. 22, 2000.

(56) References Cited

U.S. PATENT DOCUMENTS

| | | | |
|---|---|---|---|
| 5,774,170 A | 6/1998 | Hite | |
| 5,784,095 A | 7/1998 | Robbins et al. | |
| 5,794,210 A | 8/1998 | Goldhaber et al. | |
| 5,805,974 A | 9/1998 | Hite | |
| 5,848,397 A | 12/1998 | Marsh et al. | |
| 5,852,775 A | 12/1998 | Hidary | |
| 5,855,515 A | 1/1999 | Pease et al. | |
| 5,931,901 A | 8/1999 | Wolfe et al. | |
| 5,956,691 A | 9/1999 | Powers | |
| 5,974,398 A | 10/1999 | Hanson et al. | |
| 6,002,393 A | 12/1999 | Hite | |
| 6,020,884 A | 2/2000 | MacNaughton et al. | |
| 6,038,591 A | 3/2000 | Wolfe et al. | |
| 6,052,122 A | 4/2000 | Sutcliffe et al. | |
| 6,105,001 A | 8/2000 | Masi et al. | |
| 6,112,186 A * | 8/2000 | Bergh et al. | 705/7.32 |
| 6,161,142 A | 12/2000 | Wolfe et al. | |
| 6,161,149 A | 12/2000 | Achacoso | |
| 6,175,831 B1 | 1/2001 | Weinreich et al. | |
| 6,193,610 B1 | 2/2001 | Junkin | |
| 6,216,133 B1 | 4/2001 | Masthoff | |
| 6,236,975 B1 * | 5/2001 | Boe et al. | 705/7.32 |
| 6,236,978 B1 | 5/2001 | Tuzhilin | |
| 6,269,361 B1 | 7/2001 | Davis et al. | |
| 6,288,717 B1 | 9/2001 | Dunkle | |
| 6,321,221 B1 * | 11/2001 | Bieganski | 705/26.7 |
| 6,324,566 B1 | 11/2001 | Himmel et al. | |
| 6,338,094 B1 | 1/2002 | Scott et al. | |
| 6,351,736 B1 | 2/2002 | Weisberg | |
| 6,411,949 B1 | 6/2002 | Schaffer | |
| 6,466,918 B1 | 10/2002 | Spiegel et al. | |
| 6,480,785 B1 | 11/2002 | Joerg et al. | |
| 6,487,539 B1 | 11/2002 | Aggarwal et al. | |
| 6,519,629 B2 | 2/2003 | Harvey et al. | |
| 6,527,557 B2 | 3/2003 | Lemay et al. | |
| 6,546,545 B1 | 4/2003 | Honarvar et al. | |
| 6,601,037 B1 | 7/2003 | Kolls | |
| 6,604,086 B1 | 8/2003 | Kolls | |
| 6,606,605 B1 | 8/2003 | Kolls | |
| 6,609,103 B1 | 8/2003 | Kolls | |
| 6,609,120 B1 | 8/2003 | Honarvar et al. | |
| 6,615,183 B1 | 9/2003 | Kolls | |
| 6,625,581 B1 | 9/2003 | Perkowski | |
| 6,628,314 B1 | 9/2003 | Hoyle | |
| 6,629,080 B1 | 9/2003 | Kolls | |
| 6,681,369 B2 | 1/2004 | Meunier et al. | |
| 6,684,197 B1 | 1/2004 | Kolls | |
| 6,694,482 B1 * | 2/2004 | Arellano et al. | 715/251 |
| 6,757,661 B1 | 6/2004 | Blaser et al. | |
| 6,771,290 B1 | 8/2004 | Hoyle | |
| 6,772,229 B1 | 8/2004 | Achacoso | |
| 6,792,411 B1 | 9/2004 | Massey, Jr. | |
| 6,807,532 B1 | 10/2004 | Kolls | |
| 6,871,186 B1 | 3/2005 | Tuzhilin et al. | |
| 6,873,965 B2 | 3/2005 | Feldman et al. | |
| 6,886,000 B1 | 4/2005 | Aggarwal et al. | |
| 6,901,406 B2 | 5/2005 | Nabe et al. | |
| 6,925,468 B1 | 8/2005 | Bobbitt et al. | |
| 6,930,676 B2 | 8/2005 | De Haan et al. | |
| 6,947,976 B1 | 9/2005 | Devitt et al. | |
| 6,952,741 B1 | 10/2005 | Bartlett et al. | |
| 6,968,313 B1 | 11/2005 | Oran | |
| 6,968,315 B1 | 11/2005 | Nakisa | |
| 6,970,844 B1 | 11/2005 | Bierenbaum | |
| 6,973,439 B1 | 12/2005 | Wilk | |
| 6,976,439 B2 | 12/2005 | Uchida | |
| 6,999,987 B1 | 2/2006 | Billingsley et al. | |
| 7,003,546 B1 | 2/2006 | Cheah | |
| 7,006,979 B1 | 2/2006 | Samra et al. | |
| 7,014,469 B1 | 3/2006 | Nocera et al. | |
| 7,031,651 B2 | 4/2006 | McCormick et al. | |
| 7,043,531 B1 | 5/2006 | Seibel et al. | |
| 7,054,831 B2 | 5/2006 | Koenig | |
| 7,054,900 B1 | 5/2006 | Goldston | |
| 7,082,427 B1 | 7/2006 | Seibel et al. | |
| 7,085,820 B1 | 8/2006 | Nickerson et al. | |
| 7,095,426 B1 | 8/2006 | Childress | |
| 7,120,629 B1 | 10/2006 | Seibel et al. | |
| 7,158,986 B1 | 1/2007 | Oliver et al. | |
| 7,231,608 B1 | 6/2007 | Fano et al. | |
| 7,236,969 B1 | 6/2007 | Skillen et al. | |
| 7,318,224 B2 | 1/2008 | Honarvar et al. | |
| 7,321,233 B2 | 1/2008 | Strid et al. | |
| 7,330,850 B1 | 2/2008 | Seibel et al. | |
| 7,337,127 B1 | 2/2008 | Smith et al. | |
| 7,356,541 B1 | 4/2008 | Doughty | |
| 7,398,219 B1 | 7/2008 | Wolfe | |
| 7,430,514 B1 | 9/2008 | Childress et al. | |
| 7,451,094 B2 | 11/2008 | Royall, Jr. et al. | |
| 7,475,032 B1 | 1/2009 | Patnode et al. | |
| 7,603,331 B2 | 10/2009 | Tuzhilin et al. | |
| 7,752,326 B2 | 7/2010 | Smit | |
| 8,005,896 B2 | 8/2011 | Cheah | |
| 8,015,495 B2 | 9/2011 | Achacoso | |
| 8,103,611 B2 | 1/2012 | Tuzhilin et al. | |
| 8,150,913 B2 | 4/2012 | Cheah | |
| 2001/0013009 A1 | 8/2001 | Greening et al. | |
| 2001/0032115 A1 | 10/2001 | Goldstein | |
| 2001/0042002 A1 | 11/2001 | Koopersmith | |
| 2001/0056374 A1 * | 12/2001 | Joao | 705/14 |
| 2002/0059379 A1 | 5/2002 | Harvey et al. | |
| 2002/0059621 A1 | 5/2002 | Thomas | |
| 2002/0065894 A1 | 5/2002 | Dalal et al. | |
| 2002/0088010 A1 | 7/2002 | Dudkiewicz | |
| 2003/0001846 A1 * | 1/2003 | Davis et al. | 345/474 |
| 2003/0023489 A1 | 1/2003 | McGuire et al. | |
| 2003/0061215 A1 | 3/2003 | Messina | |
| 2003/0142664 A1 | 7/2003 | Gerszberg et al. | |
| 2004/0128624 A1 * | 7/2004 | Arellano et al. | 715/530 |
| 2004/0133471 A1 | 7/2004 | Pisaris-Henderson et al. | |
| 2004/0215514 A1 | 10/2004 | Quinlan et al. | |
| 2004/0249719 A1 | 12/2004 | Urpani | |
| 2004/0261127 A1 | 12/2004 | Freeman et al. | |
| 2005/0125354 A1 | 6/2005 | Pisaris-Henderson et al. | |
| 2006/0026067 A1 | 2/2006 | Nicholas et al. | |
| 2006/0090013 A1 | 4/2006 | Achacoso et al. | |
| 2007/0073581 A1 | 3/2007 | Kempe et al. | |
| 2007/0093258 A1 | 4/2007 | Steenstra et al. | |
| 2007/0118420 A1 | 5/2007 | Jung et al. | |
| 2007/0130002 A1 | 6/2007 | Moran et al. | |
| 2007/0208610 A1 | 9/2007 | Pisaris-Henderson et al. | |
| 2007/0239537 A1 | 10/2007 | Protheroe et al. | |
| 2008/0033815 A1 | 2/2008 | Choi | |
| 2008/0033826 A1 | 2/2008 | Maislos et al. | |
| 2009/0012841 A1 | 1/2009 | Saft et al. | |
| 2009/0018918 A1 | 1/2009 | Moneypenny et al. | |
| 2009/0030774 A1 | 1/2009 | Rothschild et al. | |
| 2009/0030775 A1 | 1/2009 | Vieri | |
| 2009/0030972 A1 | 1/2009 | Rogers | |
| 2009/0043648 A1 | 2/2009 | Mahdian et al. | |
| 2009/0055249 A1 | 2/2009 | Lieberman | |
| 2009/0063283 A1 | 3/2009 | Kusumoto et al. | |
| 2009/0063284 A1 | 3/2009 | Turpin et al. | |
| 2009/0067599 A1 | 3/2009 | Agarwal et al. | |
| 2009/0076899 A1 | 3/2009 | Gbodimowo | |
| 2009/0076902 A1 | 3/2009 | Grinsted et al. | |

FOREIGN PATENT DOCUMENTS

| | | |
|---|---|---|
| JP | 2004533020 | 10/2004 |
| WO | WO 02/104005 | 12/2002 |

(56) References Cited

FOREIGN PATENT DOCUMENTS

| WO | WO 03/058531 | 7/2003 |
|----|----|----|
| WO | WO 2004/021152 | 3/2004 |
| WO | WO 2004/051418 | 6/2004 |
| WO | WO 2005/043341 | 5/2005 |

OTHER PUBLICATIONS

Klaas Kox, HAIT Master Thesis series nr. 08-005, "Mobile Contextual Advertising," Tilburg University, Tilburg, The Netherlands, Dec. 2008, 28 pages.

http://www.google.com/press/pressrel/pressrelease39.html, Google Launches Self-Service Advertising Program, Oct. 23, 2000.

Upendra Shardanand and Pattie Maes, MIT Media-Lab, "Social Information Filtering: Algorithms for Automating 'Word of Mouth,'" May 7-11, 1995, CHI '95 Mosaic of Creativity, pp. 210-217.

http://m.wired.com/magazine/2010/07/ff_caterina_fake/ Devin Leonard, What You Want: Flickr Creator Spins Addictive New Web Service, Jul. 28, 2010, pp. 1-5.

http://web.archive.org/web/19981212013921/http://facebook.com/ 1998.

http://web.archive.org/web/19990125085655/http://facebook.com/ 1999.

http://web.archive.org/web/19990208013055/http://www.facebook.com/ 1999.

http://web.archive.org/web/19990825020910/http://facebook.com/index.html 1998.

http://web.archive.org/web/20000414064120/http://facebook.com/index.html Apr. 14, 2000.

Encyclopedia of Library and Science, vol. 71, Allen Kent, p. 156 (2002).

http://en.wikipedia.org/wiki/Keyword_advertising Oct. 30, 2008.

http://news.cnet.com/Pay-for-replacement-gets-another-shot/2100-1023_3-208309.html Feb. 19, 1998.

http://sigchi.org/chi95/proceedings/papers/us_bdy.htm 1995.

\* cited by examiner

Example Search Screen Flow – USER side of the system

| | |
|---|---|
| A. | SIGN IN and SEARCH or JOIN option prompt |
| B. | USER SIMILARITY PROMPT |
| C. | SCOPE OF DATABASE PROMPT |
| D. | JOIN SOLICITATION and initial preference question prompt to user |
| E. | TRAIT OPTION SCREEN defining micro-demographic to search |
| F. | VARIABLE TRAIT selection screen, narrowing variable based target demo group |
| G. | FACTOID advertisement deemed relevant to USER based on data collected to this point |
| H. | PREFERENCE MENU SCREEN wherein user selects personal preference and personal issue areas of interest related to their micro-demographic. |
| I. | FACTOID advertisement selectively relevant to the indicated preference areas and the users indicated micro-demographic . |
| J. | RESULTS SCREEN related to data correlation of preference regarding the users' micro-demographic group and the areas of interest selected in preferences menu. Option of selecting a result to further correlate that result to the users' micro-demographic group. |
| K. | TOP TEN, or selected amount of closest correlating members to the users' micro-demographic parameters, who selected a preference aspect. |
| L. | SELECTED DATABASE MEMBER deemed of interest by the user, likely based on photo featured and/or selected data featured in the "top 10" database members screen provided. This member's areas of personal preference and personal feedback collected are featured for the user to select, toward reviewing long form and provided options feedback from the member in this area |
| M. | LONG FORM FEEDBACK is provided related to a selected area of personal preference. |
| N. | OPTIONS of cross referencing this new area of preference with the users' micro-demographic as a whole and other database option such as the review of other preference data of members selectively similar to a selected single member, changing the micro-demographic completely to be relevant to the traits of another member are given. |
| O. | OPTIONS to return to preference screen and other phases of the search to begin with new preference areas, or a new micro-demographic should a return to the TRAIT screen be selected. |

FIG.1

Example JOIN Data-Input Screen Flow - MEMBER side of the system

A. TRAITS OF MEMBER MENU and feedback screen

B. PREFERENCES OF MEMBER MENU and feedback screen and sub-screen for longer form feedback C. SUBMISSION OF PHOTO and/or other visual or audio data for posting within the members' searchable profile within database D. MEMBERS' incentive point accrual total E. MEMBERS' example redemptions option prompt screen F. MEMBERS' full redemption catalog G. MEMBERS' incoming e-mail from USERS, where in responding to such mail provides additional incentive points to the member.

H. ADVERTISING posting agreeably received by point accruing members, example

I. POSTING BOARD uniquely assembled for MEMBER based on trait and preference data collected regarding the member

FIG.2

POP UP SCREEN :

I would like to focus my search to the following:

☐ ALL MEMBERS IN THE DATABASE

☒ TOP 10 CLOSEST MATCHES TO MY DEMO

☐ TOP 50 CLOSEST MATCHES

☐ TOP 100 CLOSEST MATCHES

☐ TOP 5% CLOSEST TO MY DEMO

☐ TOP 10% CLOSEST TO MY DEMO

☐ TOP 15% CLOSEST TO MY DEMO

☐ Include only members who gave long form feedback on answers

■ Include only members with photos or video

MUSIC ITEMS AVAILABLE-click item to order with points and/or cash (Pay $5 per 10 points extra)

☐ CD singles 150 points
☐ full Cd's    500 points
☐ DOWNLOAD singles 50 points
☐ VIP passes at concerts 200 pts
☐ AUTOGRAPHED items 500 pts
☐ etc, etc.

FIG.8

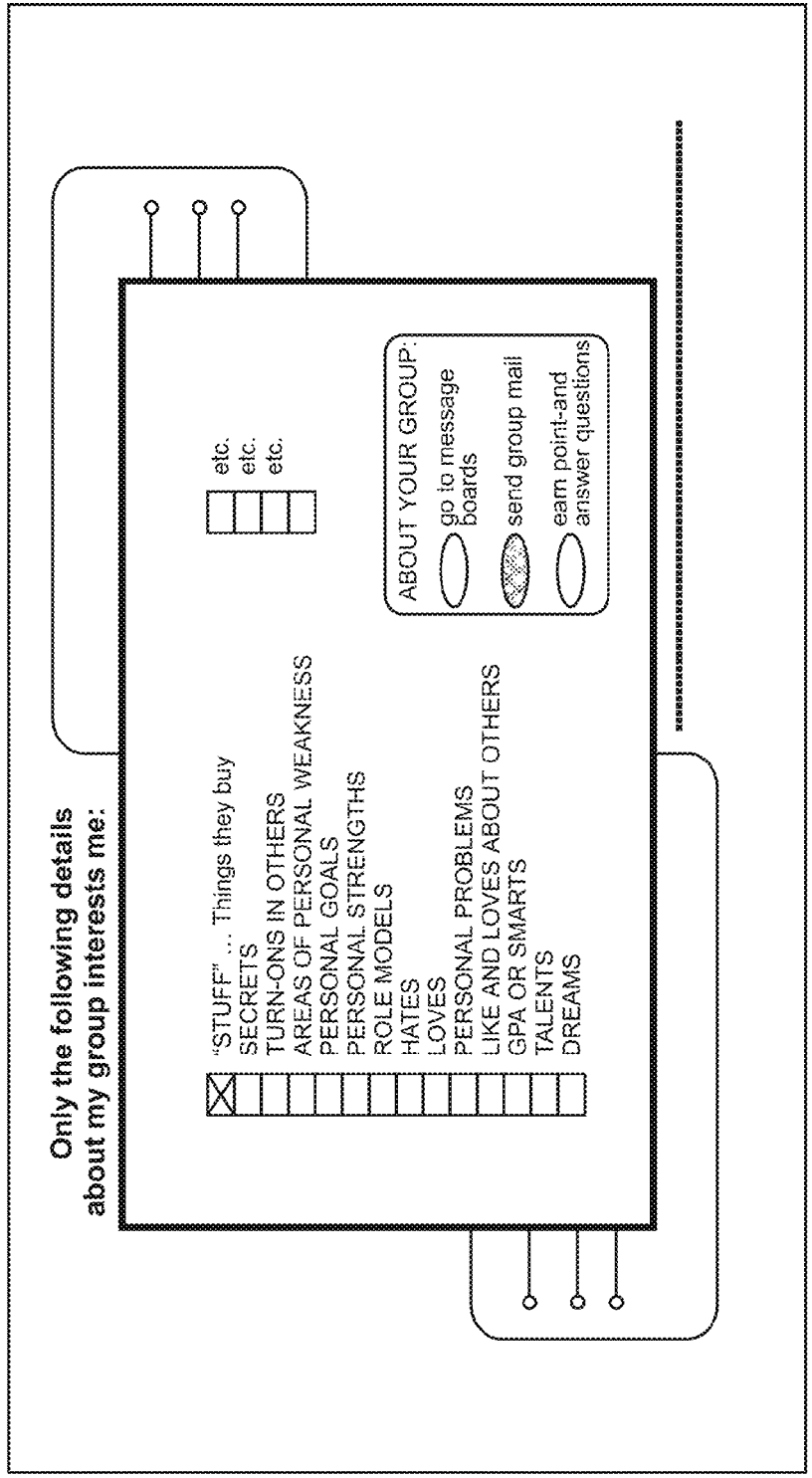

FIG. 17

METHOD AND SYSTEM FOR COMPILING A CONSUMER-BASED ELECTRONIC DATABASE, SEARCHABLE ACCORDING TO INDIVIDUAL INTERNET USER-DEFINED MICRO-DEMOGRAPHICS

RELATED APPLICATIONS

The present application is a continuation of prior U.S. patent application Ser. No. 12/707,363, filed Feb. 17, 2010, which is a continuation of prior U.S. patent application Ser. No. 09/808,538, filed Mar. 14, 2001, now U.S. Pat. No. 7,720,707, issued May 18, 2010, which is a continuation-in-part of U.S. patent application Ser. No. 09/756,581, filed Jan. 8, 2001, now abandoned, which is based on and claims priority to U.S. Provisional Patent Application Serial Nos. 60/175,093, filed Jan. 7, 2000, 60/176,440, filed Jan. 14, 2000, 60/189,060, filed Mar. 14, 2000, 60/212,663, filed Jun. 20, 2000, and 60/226,672, filed Aug. 22, 2000, the entire contents of all of which are hereby incorporated by reference.

BACKGROUND OF THE INVENTION

1. Field of the Invention

The present invention relates to a system and method for referencing consumer preference data and merchandise and service "popularity" according to human physical and emotional characteristics, traits and personal preferences. In essence an animate, or "HUMAN" cataloging and method/system for researching and locating purchasable items and preference data, rather than an inanimate one. This system and method would preferably be Internet based, presented as a special Internet address and destination, comprising a "search engine," or searching means based on "searcher" or Internet user supplied human trait and preference data parameters.

2. Description of the Related Art

Current "e commerce" or computer based electronically transacted business options, and related inventions thereof, are limited in scope typically with regard to the indexing and cataloging of merchandise and services. Further, "search engines" familiar to Internet users, are limited often to search results based on correlation between words or phrases submitted by the user, relative to those assigned to Internet accessible sites and data banks.

In a society of individuals who make many decisions based on dynamics of personal competition and success, and interpersonal comparison, the need for a searching means to reference information based on traits and preferences of other individuals, and groups of individuals, would clearly be valuable and of interest to many. The most compelling lure of entertainment and advertising, is information about other individuals that might be considered "private" or personal, whether they be celebrities or not. Television programs and advertising that is "revealing," especially those focused to the negative feelings and occurrences of others, are remarkably successful: "Rubber-necking" on a highway also demonstrates the public's often macabre fascination with the plight or misfortune of others. The same can be said with the public's fascination with the success of others, mostly relative to their own circumstances and personal esteem.

The means to search personal preference and "feelings" data of actual individuals, would allow the Internet user new options in discovering the behavioral and purchasing preferences of individuals similar to themselves, or similar to a person or "type" of person relevant to the user: Those of romantic interest to an internet user/searcher, and those who the Internet user may be competitive with, are two examples of searching parameter bases that may be relevant to a particular individual searching via such newly available means. Further, peripheral areas of interest may be discovered by users as they discover selected personal data about their designated "types" of people-leading Internet searchers to revelations steered by the options displayed by such a system and searching means.

For Internet advertising, the relevance of being able to target user determined and defined micro-demographics is invaluable. A searcher who has defined their own dynamics demographically, in order to accomplish their search, could receive selected advertisements in editorially prepared formats, to maintain the highest degree of personal relevance and potential interest, unlike the generally poorly focused myriad of solicitations broadcast to millions of Internet users and mail box holders.

To date, all demographic specific devises on the Internet are geared to "sampling" and looking at the Internet users from the data-seekers' vantage point. The present invention addresses the interest and need of the Internet user to personally discover discreet demographic preference and behavioral data relative to their own personal objectives and interests: An active demographic specific vehicle from the consumers' point of view, instead of a passive one where their activity and data is sampled and they are categorized and solicited according to the interpretation and interests of unseen others—typically larger Internet based firms and advertisers.

SUMMARY OF THE INVENTION

The present invention relates to a system and method for referencing consumer preference data and merchandise and service "popularity" according to human physical and emotional characteristics, traits and personal preferences. In essence an animate, or "HUMAN" cataloging and method/system for researching and locating purchasable items and preference data, rather than an inanimate one. This system and method would preferably be Internet based, presented as a special Internet address and destination, comprising a "search engine," or searching means based on "searcher" or Internet user supplied human trait and preference data parameters.

The present invention provides options for "users" or "searchers," (those using the database,) to reference and compare other personal traits and feedback from "members" (those having supplied the core data to the database,) allowing the database to serve as a source of information for decision-making and correlation related to matters beyond the purchase of products and services: In essence, a "people" based Internet SEARCH ENGINE rather than a "things," brand category or typical word-correlating search engine.

In placing the control in the hands of the Internet searcher, the intrigue and interest in the options provided by the search engine grows. The very demographic specific information that advertisers seek, is the same sort of information that individuals wish to know about each other.

Further, the present invention in providing such discreet targeting research means for Internet users, Internet advertisers are reciprocally empowered with new consumer targeting means, based on remarkably discreet demographic groupings based on consumer determined parameters. In building such a special database and search engine, advertisers are further advantaged editorially, as database information relevant to their brand or industry can form the basis of "search relevant"

factoids, which are in fact paid flash advertisements relayed when the factoid information is deemed relevant to the searchers' information quest.

Accordingly, a system and method for accessing actual human personal preference and opinion data, whose unique demographic parameters are defined by an individual Internet user is provided. The system includes a computer linked to a specialized database which allows individual Internet users to supply and access human personal preference data according to trait and preference variable data input to the system.

The system contains a data correlating program which provides data sorting parameters that are defined by selected degrees of human trait and preference variables. Further, data pertaining to any one of these trait and preference variables may be assigned special program value, should special importance of the selected data be indicated by those who access the database. Variables not provided by the system to the Internet user are preferably provided by the user as keyed-in, or otherwise subjectively supplied data that may be included in data correlation and reports for that user. Users, or those accessing the database for customized data results from the overall database, may, in turn, supply information to the database, or build a data profile, should they indicate that the data they seek pertains to individuals similar to themselves. The data they seek and supply pertains to their personal traits and personal preferences, including feelings, opinions, issues and purchasing or commercial preferences.

With the system and method of the present invention, users may refine their demographic of choice within a search, by way of system provided options deemed to be standard options provided to users at selected points within a search. Users may also refine their search by re-entering the demographic related trait and preference data, preferably by re-accessing Internet site screens already accessed within the same search, for input of revised demographic parameter data.

Further, the present system and method allows advertisers to target their information (products and services) with extreme specificity to users, as the users themselves are defining the areas of demographic interest. Advertisements may occur as editorial comments with Internet links, pertinent to data in the database specific to a products' or services' sampling results. These "factoids" may be calculated and relayed specifically to a single user who has met subjective system user relevance criteria to receive selected advertising data results. Further, focus group data, or consumer preference sampling may be accomplished with immediacy and unrivaled relevance, as only users and members of selected relevance to the data solicitation might be contacted. In other words, discreet trait and preference specific groups of individuals that would be virtually impossible to locate and sample with typical focus group approaches are able to be located by the present system and method.

Some important aspects and benefits of the present invention, include that it provides:

A unique database of value to consumers, advertisers, brands and other organizations seeking extremely discreet and quick, specific and accurate consumer preference feedback.

A database which can be referenced with a virtually infinite number of demographic options, from broad to remarkably specific, with a large range of preference responses becoming available. And, with the preferable ability to modify micro-demographics being sampled based on user revisions of the search based on selected preferences and opinions.

A searching innovation for consumers which will attract new Internet users to any "parent site" preferably housing databases based on the present invention.

The ability to cross-market, co-venture and/or couple with other brand's sites, other e-commerce sites and other internet properties in general, linking to and from by virtue of the unique revelations and options that the invention creates for both consumers and businesses.

New means for people to connect with the specific types of people that can assist or benefit them in their unique, personal and professional circumstances.

Revenue potential of Internet based resources involving the technology of the present invention would likely be derived from options including:

LINKING from featured brands to brand sites or purchasing options.

FEES for brand inclusions in pull-down screen options (pull down screens provide "options.")

ADVERTISING: Banners and "factoids" for brands when certain areas of interest are explored (pop-up promos and information related to the selected traits and/or preference data.)

SALE OF SPECIFICALLY SOLICITED data, requested by clients via standard member data solicitation screens, or specific short-term "pop up" data prompt screens/menus.

Attraction of new users to a parent site and that site's services

The direct sale of selected items or revenue from linked sales or referrals.

SALE OF DATA that is more comprehensive and not searchable on the site by members.

FEES charged for relaying names of SEARCHERS and/or MEMBERS who agree to have literature of mail forwarded from selected brands, or brands within selected categories.

FEES to members to use the service and to email each other and receive other site services reserved for members, potentially offset by meeting data-supplying or site usage thresholds.

FEES to brands to be "multi-listed" or programmed to appear when a MEMBER or SEARCHER references "suggestion" screens which may list brands to consider in supplying accurate preference data.

ADVERTISERS can send ad messages within the CLOSED email system with remarkable specificity, reaching their "dream" demographics and audience, with the same ease and focus that MEMBERS do, with their own personal messages.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 1 is a block diagram illustrating the preferred sequence of interactive prompts, or Internet screens, presented to an Internet "searcher" or user, accessing the database of the present invention in search of specific preference and opinion data.

FIG. 2 is a block diagram illustrating the preferred sequence of interactive prompts encountered by an Internet user who might be supplying data to the database of the present invention, resulting in a specific data profile of that individual, in exchange for incentives.

FIGS. 3 through 16 illustrate the preferred interactive, Internet screens encountered during a search utilizing the present system and method.

FIG. 3 illustrates a preferred "sign in screen" related to an interacting Internet site based on the present invention.

FIG. 4 illustrates a preferred Internet screen that would prompt a user to identify if data being sought might be related to themselves, allowing for the building of a profile of the searcher, based on the searcher's own search parameters and interaction.

FIG. 5 illustrates a preferred solicitation for data from a user searching the database, to sample the searchers toward completing database relevant profiles of them, perhaps in exchange for the useful data supplied to them during their search.

FIG. 6 illustrates a preferred Internet screen prompting a user to provide trait-related data defining the demographic, or micro-demographic group of interest to that user for the search. The screen further prompts the user, selectively, to assign A, B or C importance to the traits they select, C being the highest degree of importance in this scenario.

FIG. 7 illustrates a secondary Internet screen prompt, requesting more discreet data from a user for the searching parameters with regards to a selected demographic defining trait, in this instance, "demeanor." FIG. 7 further illustrates a FACTOID advertisement, or flash advertisement provided in a database and user search relevant format to maintain the highest degree of relevance for the user. Linking means are also provided in this example, to the site of the advertiser who has been featured in this FACTOID deemed relevant enough to present to this Internet user, based on their feedback through the system to this point.

FIG. 8 demonstrates interactive variables that may be provided to users in further defining the demographic, or micro-demographic of relevance to their searching needs. In this scenario, options including narrowing the sample group based on the user supplied trait variable parameters based on a selected number of database profiles (or people,) or a selected percentage of the total database deemed by system parameters to be most similar to the user-defined micro-demographic. Further, the option to further narrow the sampling based on secondary variables, such as those database profiles that include photos or visual data, is demonstrated. FIG. 8 further demonstrates a menu for selecting items available for redemption with points accrued from an incentive program designed to solicit data in to the database from users, in exchange for redeemable points, or the like. This demonstrates the promotion of the data accrual needs of the database, to grow and evolve it in to a more discreet and comprehensive Internet user and advertiser resource.

FIG. 9 illustrates a preferred interactive Internet screen that would allow users to define the areas of opinion and/or preference information personally relevant to that user pertaining to the demographic group that user has already defined by providing trait and/or other demographic defining parameters. FIG. 9 further demonstrates the continual options provided to users, such as redefining their demographic of interest, sending mail to their uniquely defined demographic among other Interactive options to maintain the user as the one controlling both the search parameters and the direction of the searching process. In FIG. 9, the user has selected "music" as an area of preference data interest.

FIG. 10 illustrates a FACTOID presented by the system to this particular user, based on a system determination that the user supplied data to this point in the search warranted this particular data FACTOID featuring this particular advertiser and link, to be relayed to this user. This FACTOID further demonstrates the preferred format and level of trivia and user-relevant interest that these unique advertising vehicles, tied to information from the database, may provide.

FIGS. 9 and 10 further demonstrate a display screen of some "preference" category options a SEARCHER might encounter. MEMBERS would have been presented selectively with the identical options when inputting their responses for direct and logical cross referencing of data for SEARCHERS. Options of sending mail or posting messages at any point during the search to a selectively specific number of members meeting selected similarity parameters to the SEARCHER are demonstrated. Other options such as becoming a member (FIG. 3) or returning to the previous screen are among other ongoing options that may be kept on-screen throughout a search and that are selectively provided.

Figure 10:
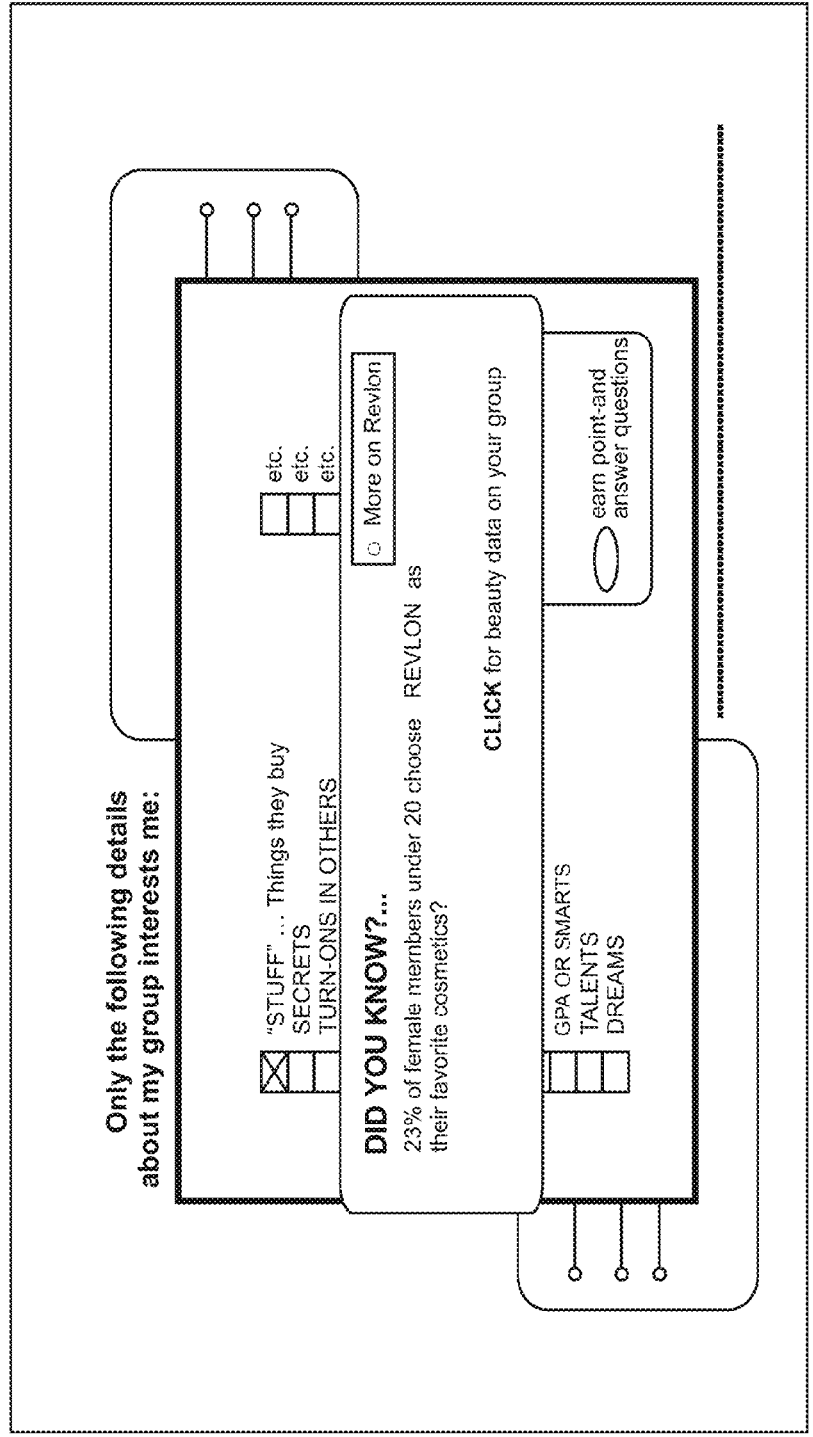

Moreover, FIG. 10 demonstrates a pop-up FACTOID advertisement and LINKING means, wherein an advertiser who has paid to be presented has been identified by computing means managing the database to be relevant enough to the given SEARCHERS current inquiries and selections, to have their advertisement featured; the advertisement would selectively be configured as a relevant piece of data pertaining to the database, to give it specific "human" or preference based relevance to the SEARCHER, with the selective option of having DIFFERENT data facts from the database pertaining to a single advertiser, or automatically variable facts that update automatically, available for display when selected thresholds of information relevance are met.

Figure 11:
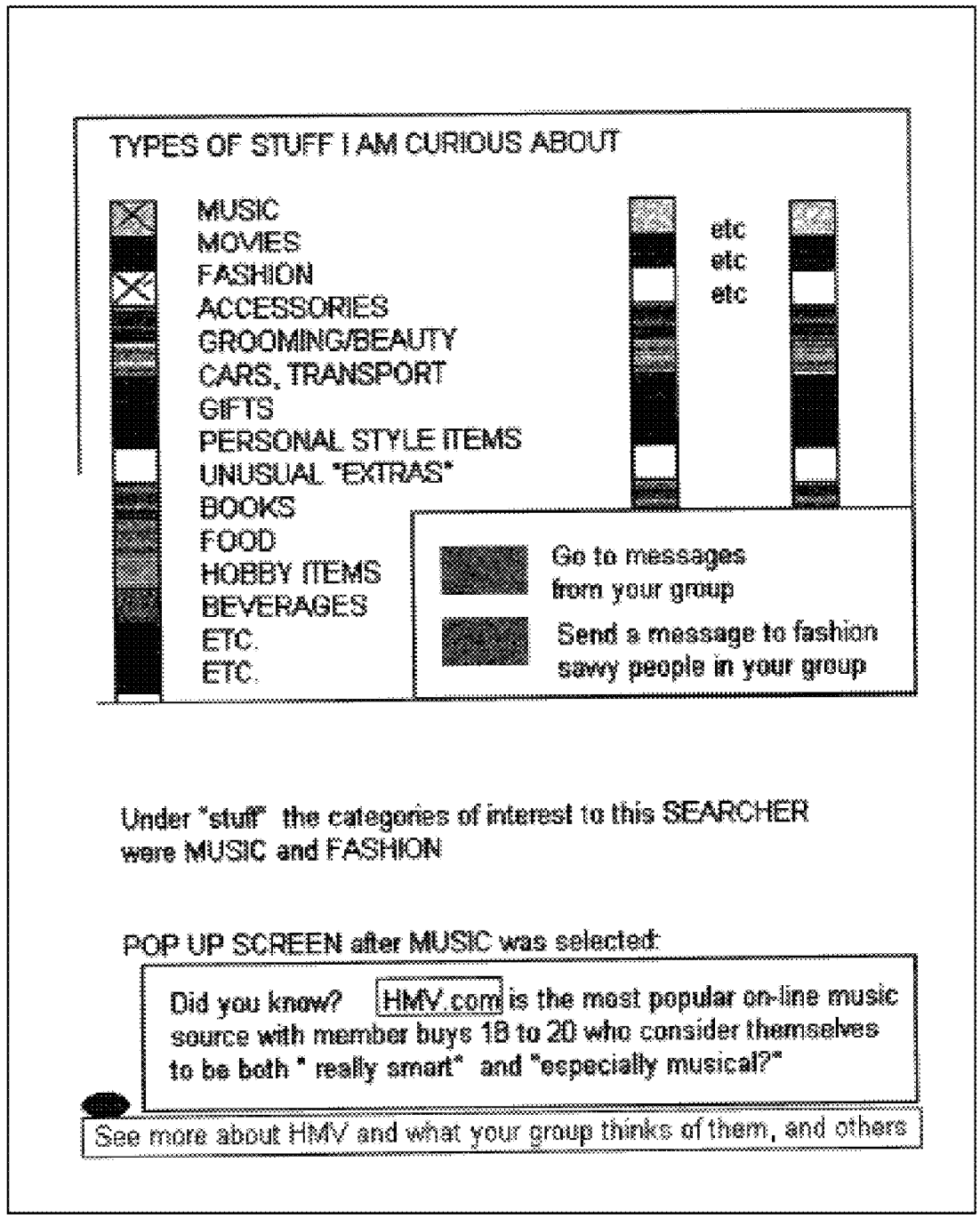

FIG. 11 demonstrates a possible detailing of a PREFERENCE OPTION category selected by the SEARCHER, showing the "opening up" of options that occurs when a SEARCHER begins to delve in to areas of interest. In this instance, two areas of product-related interest have been selected pertaining to the SEARCHERS custom demographic determined by the SEARCHER's initial trait variable selections.

FIG. 11 also demonstrates the display of a FACTOID featuring an advertiser, that was deemed appropriate to display, after the SEARCHER selected MUSIC as a preference area of priority.

FIG. 11 also demonstrates ongoing displayed options that may be selectively featured, including the option at that given point in the search to EMAIL those members meeting the custom-demographic criteria of the SEARCHER who have relevance to one of the preference sub-categories selected: FASHION.

Figure 11A:
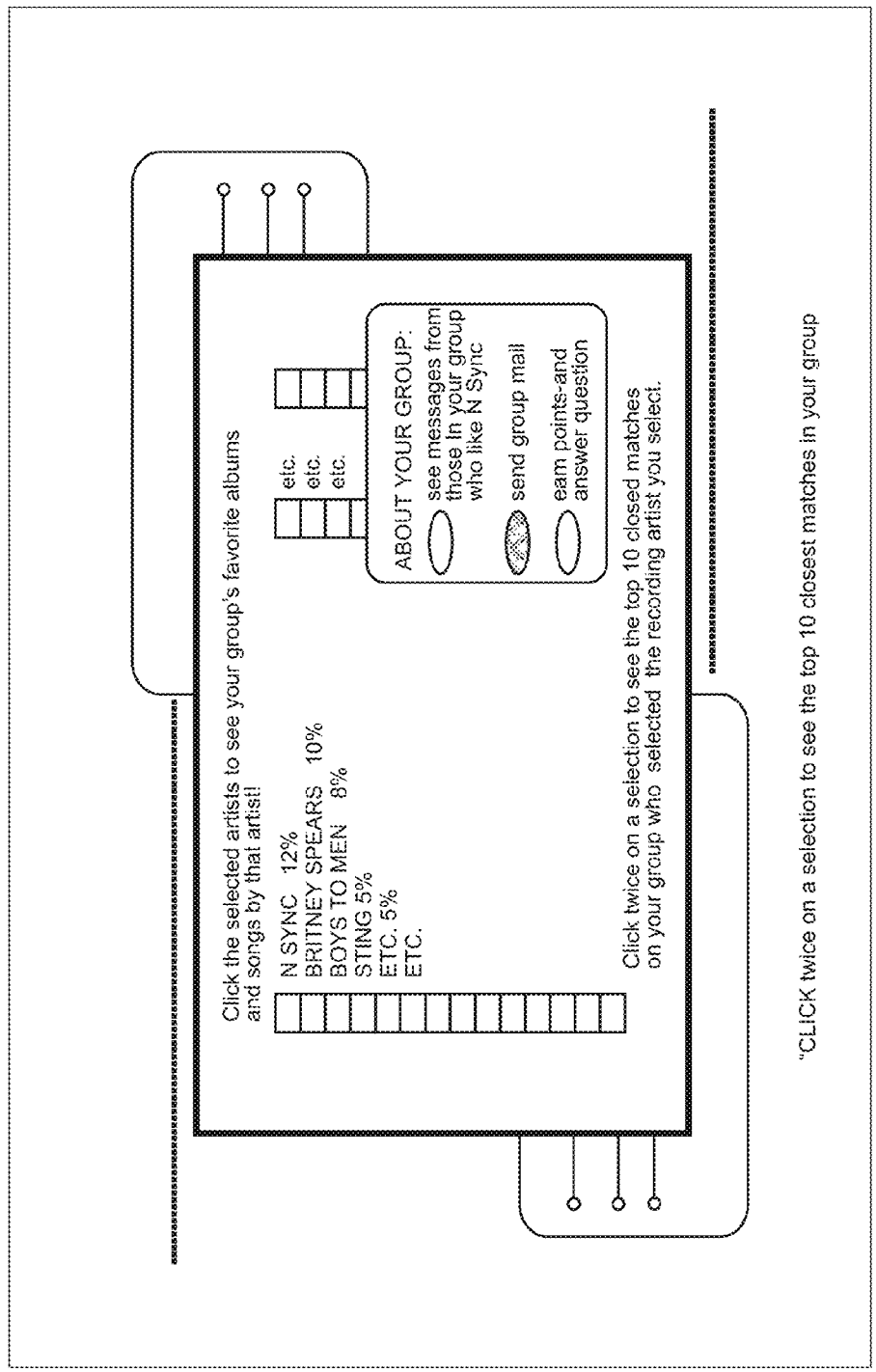

FIG. 11A illustrates a database correlation results report, detailing current music preferences of the user-defined demographic grouping of database profiles, i.e., people. This Internet screen report further provides interactive options to the user in defining the next stage of their search, including more discreet data related to the music results showcased, and the option of displaying a selected number of actual database "members," or users who have profiles within the database, who meet selected similarity criteria to the users' selected trait and preference parameters.

Figure 11B:
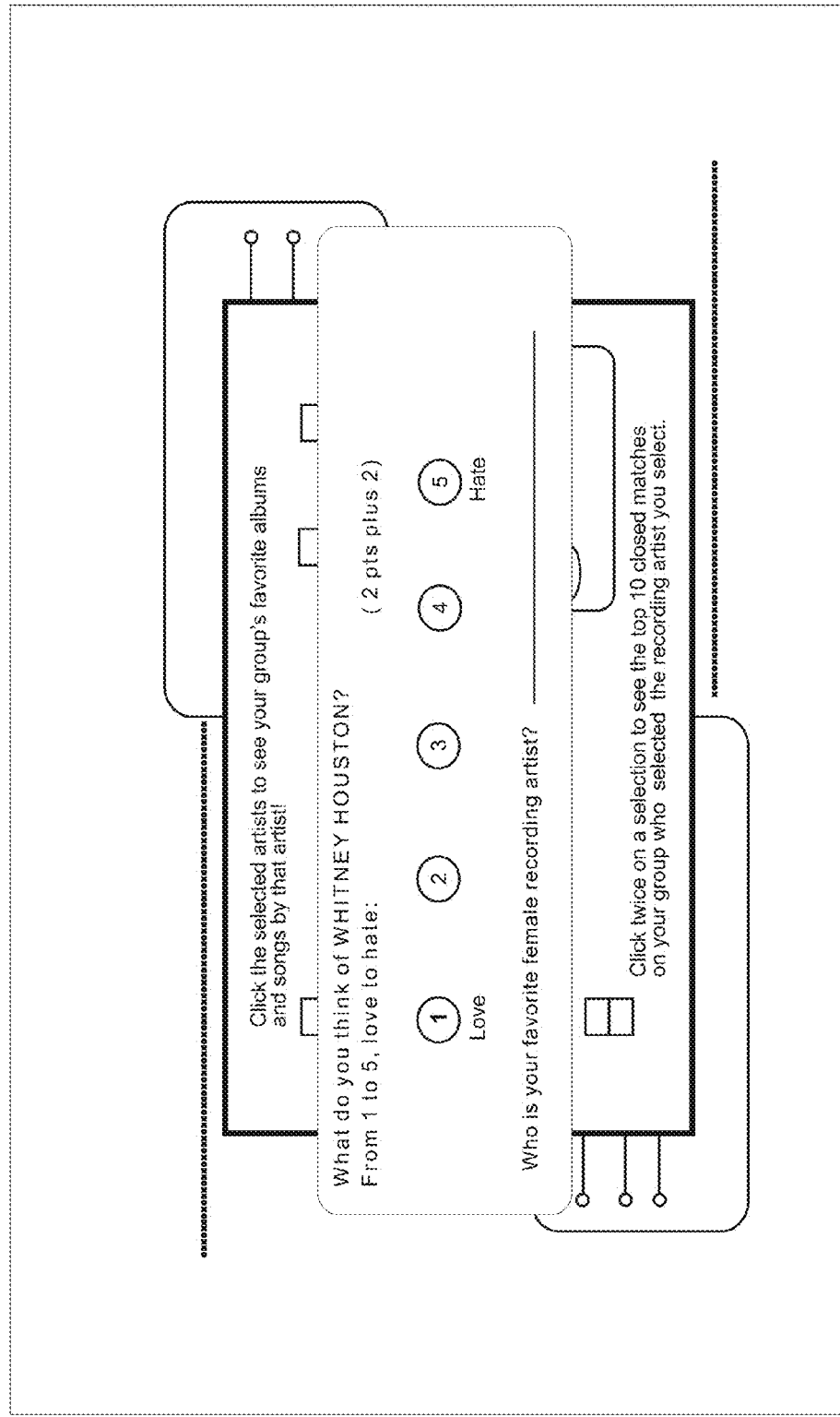

FIG. 11B illustrates a selected "focus group" study prompt, provided to this particular user, the user having met requirements to be considered relevant to the focus group data gathering needs. Naturally, this service and function of the present invention is a revenue aspect, allowing advertisers and brands to derive incredibly discreet demographic specific feedback virtually immediately, by way of services based on the present invention.

Figure 12:
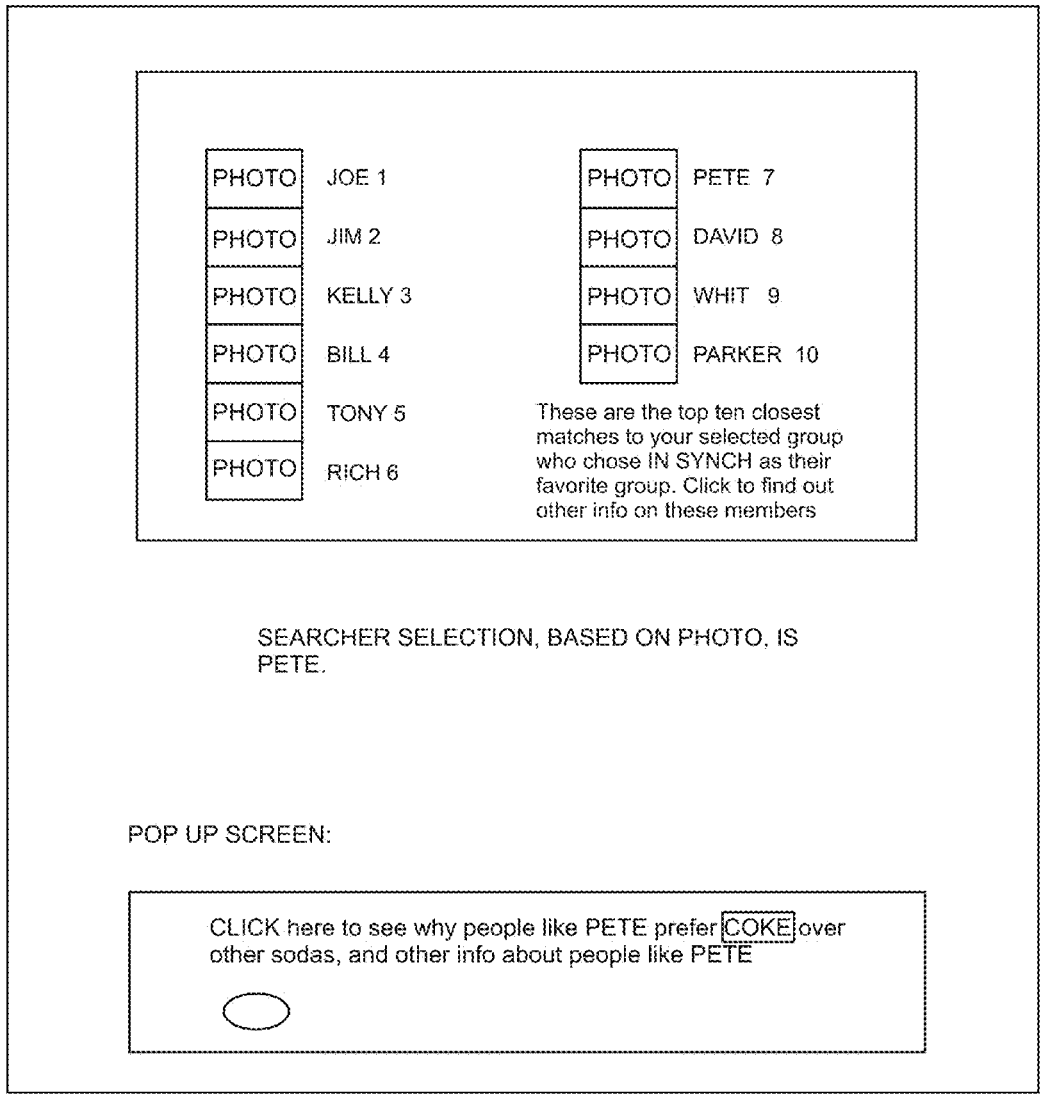

FIG. 12 illustrates a scenario wherein the top ten database members, or individual with both profiles and photo data within the database, are displayed. "Top ten" being defined by members meeting trait and preference criteria supplied by the user in their search. FIG. 12 further illustrates a FACTOID advertisement that appears when the user selects a member from the ten, who has a profile that allows selectively relevant database information to be featured that is relevant to the user now, because the user has shown interest in a specific database member, or profile, wherein the particular preference featured in the factoid is an aspect of that member's feedback and profile. The further option of reviewing information related to an entirely new demographic sampling, in this instance "people like Pete," opens the option of selectively relevant data being relayed to the user having the impact of redefining the areas of search and preference curiosity for the user.

The FACTOID in FIG. 12 is displayed after a single member has been selected by the SEARCHER—a FACTOID with relevance to the MEMBER selected which at this point has been determined to be a person of special interest to the SEARCHER, so data pertaining to him and others like him is selectively assumed to have special interest and selling potential. Linking means to provide further value to advertisers is also demonstrated.

Figure 13:
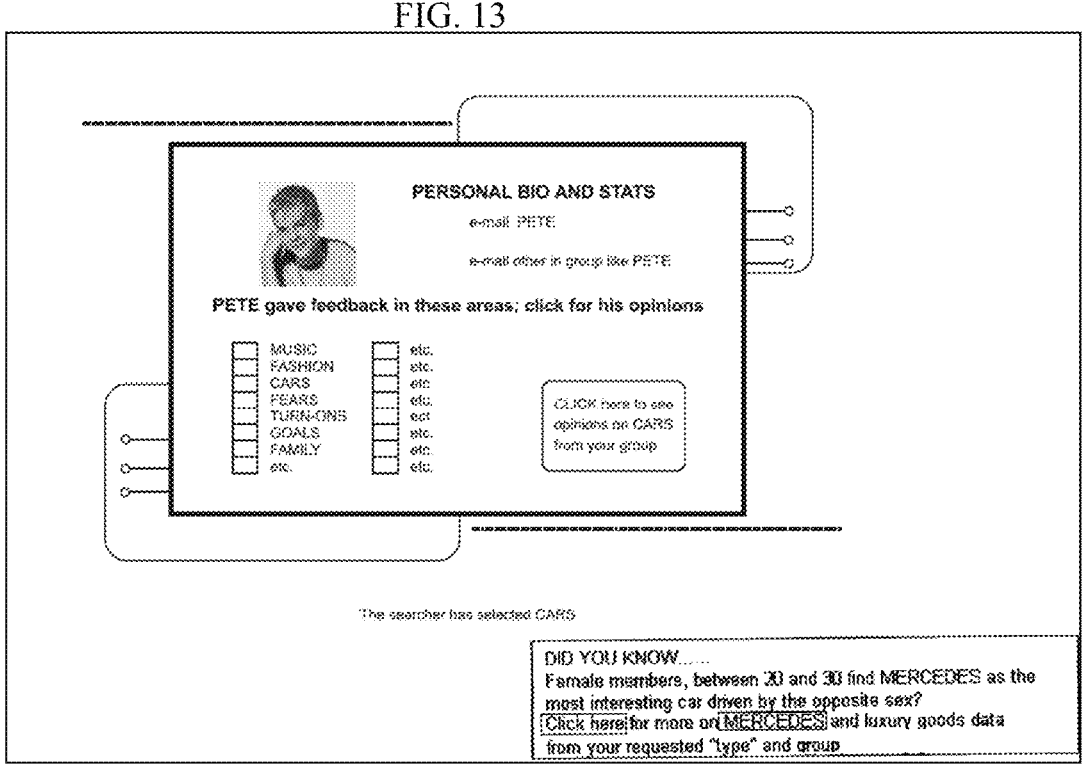

FIG. 13 illustrates a detailing of opinion and preference data the individual member, or selected profile, contains. On selecting a new area of preference interest, "cars," prompted from the list of available data related to the selected member profile, in this scenario the user receives the option of reviewing data from the users ORIGINALLY defined demographic group in relation to the NEWLY selected preference/opinion venue.

FIG. 13 demonstrates further options that might be presented once a further subcategory is selected by the SEARCHER: the example given involves CARS, so the option of referencing back to car preferences of the SEARCHER's entire custom-demographic is selectively provided, as is a FACTOID of relevance to cars that may have further relevance to parameters input by the SEARCHER, (in this case, females of a selected age range is demonstrated as being of increased relevance.)

Figure 14:
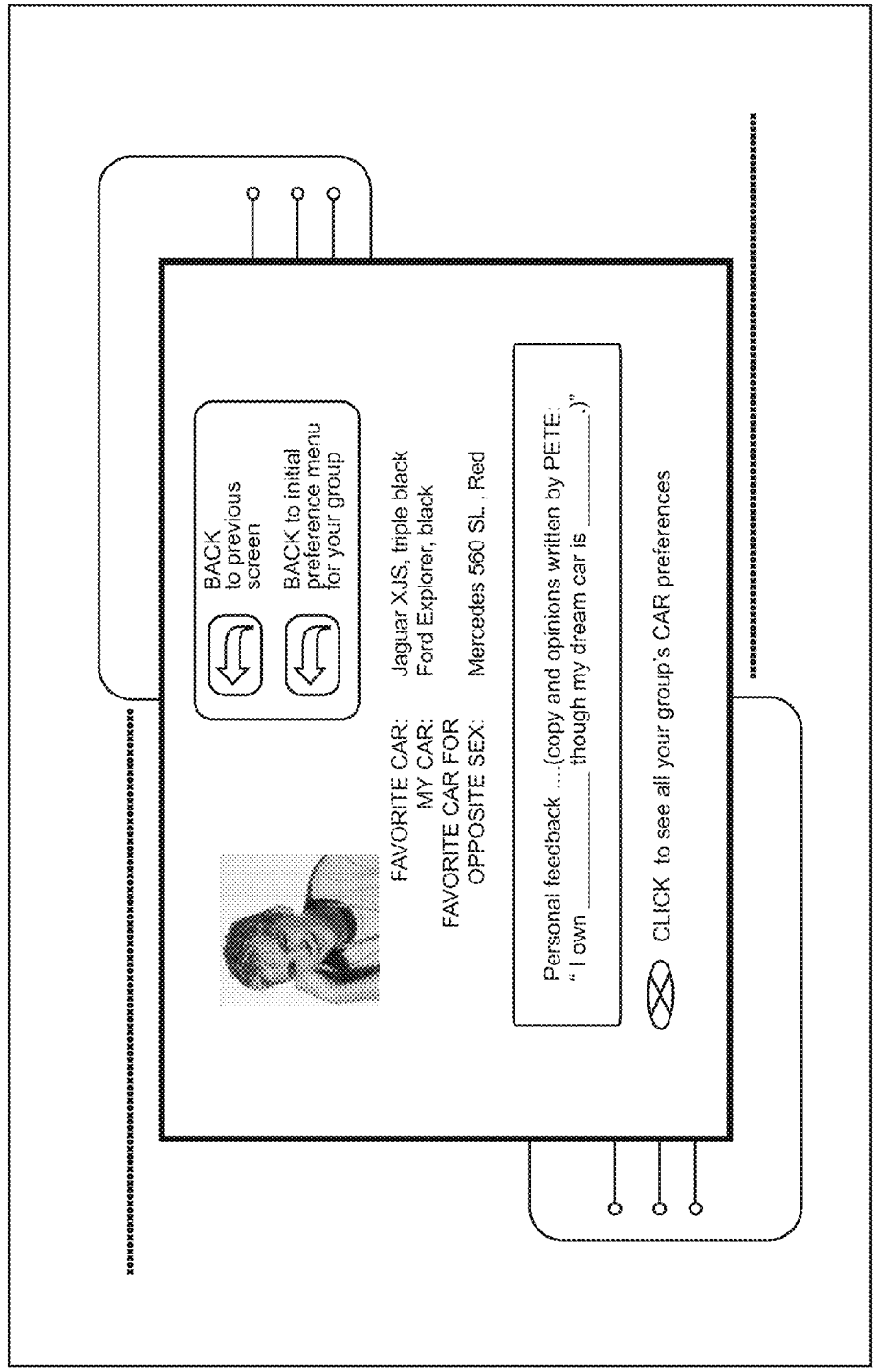

FIG. 14 details subsequent, more detailed "long form," or keyed-in feedback within an individual database member profile that a user may access. FIG. 14 further demonstrates a user selecting the system supplied prompt of reviewing the selected preference in relation to the originally defined demographic. This aspect is an illustration of the preferred effect of user pro-activity and advertiser friendly system prompts to users, creating an illusion of control for users over a search that is steered by the system toward areas of revenue for the system and applications of the present invention, however subtle and covert to not destroy the editorial integrity of the search relevance to a user.

Figure 15:
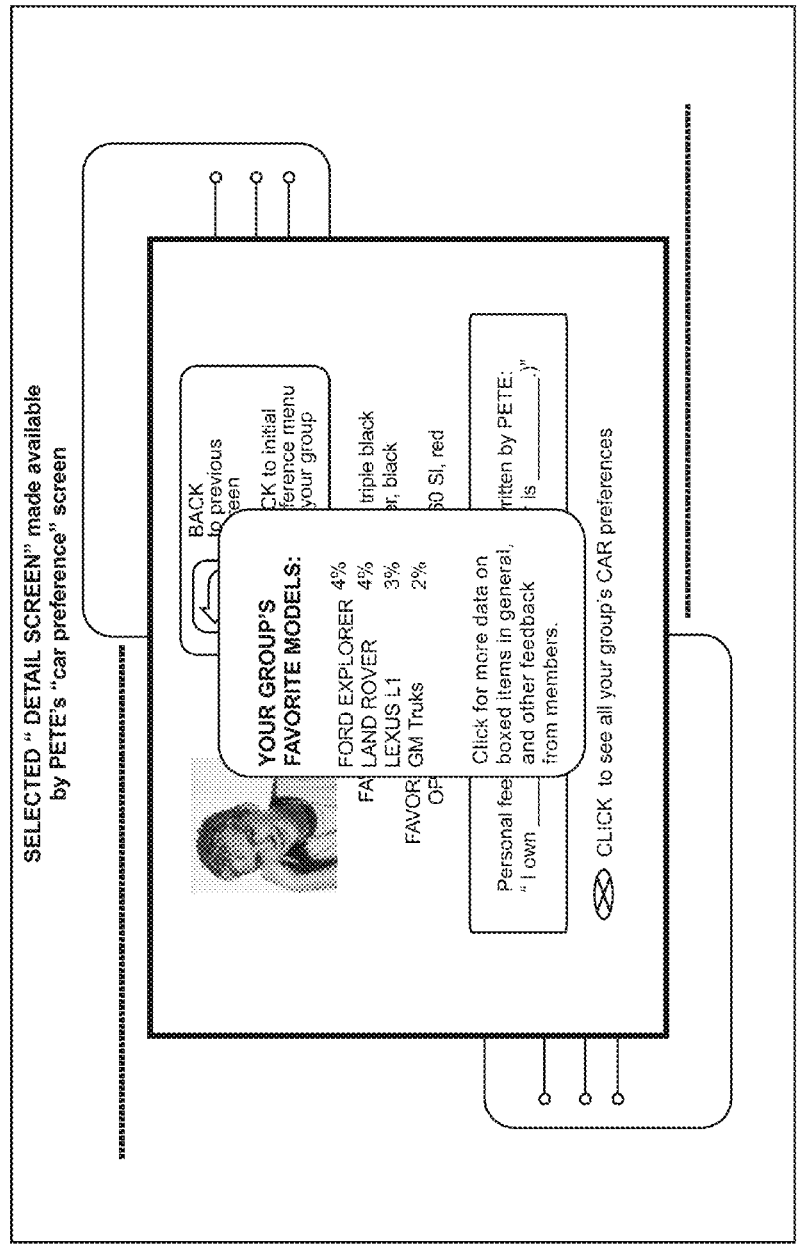

FIG. 15 illustrates selected results in the selected preference area, "cars," related to the user's originally defined demographic group of interest. Linking means to selected advertisers who appear within the overall list of preference results is demonstrated as well, providing added value to those brands over those who were listed but were not advertisers, for example.

Figure 16:
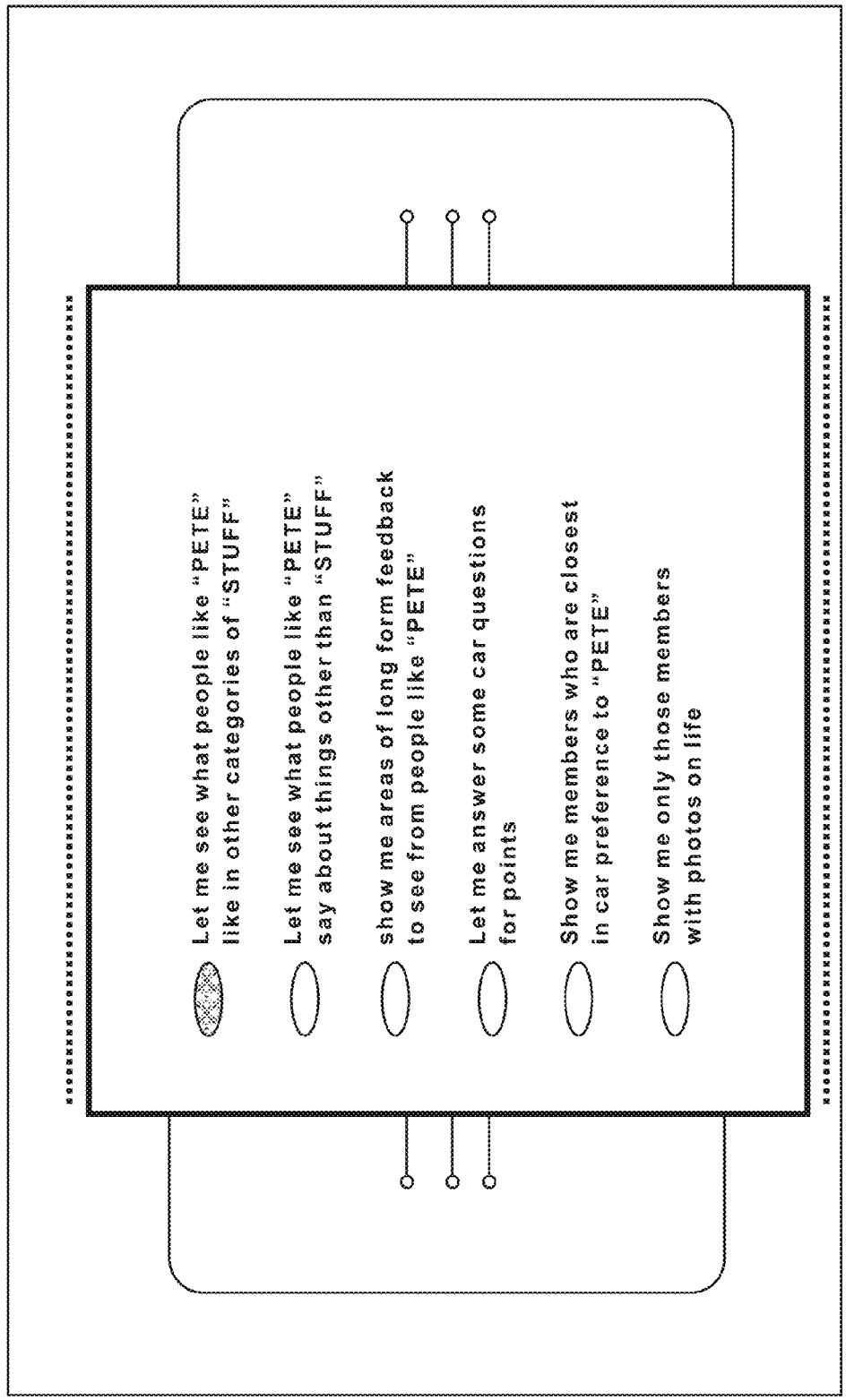

FIG. 16 details further system supplied prompted options for a user to refine their demographic of interest, and feedback venues or preference areas related to the groups selected and correlated. These options further demonstrate a balance between "editorial" and "advertising," as options are provided to expand the proactive searching means for the user, though the options provided may serve discreet and specific areas of interest for the system to "guide" a user, or users, for revenue purposes. FIG. 16 further demonstrates options that might be provided to a SEARCHER after they have reached the end of a direction of inquiry, to move them with ease back in to the database for other searching options to occur, maintaining time within the site for as long as possible.

Figure 17:
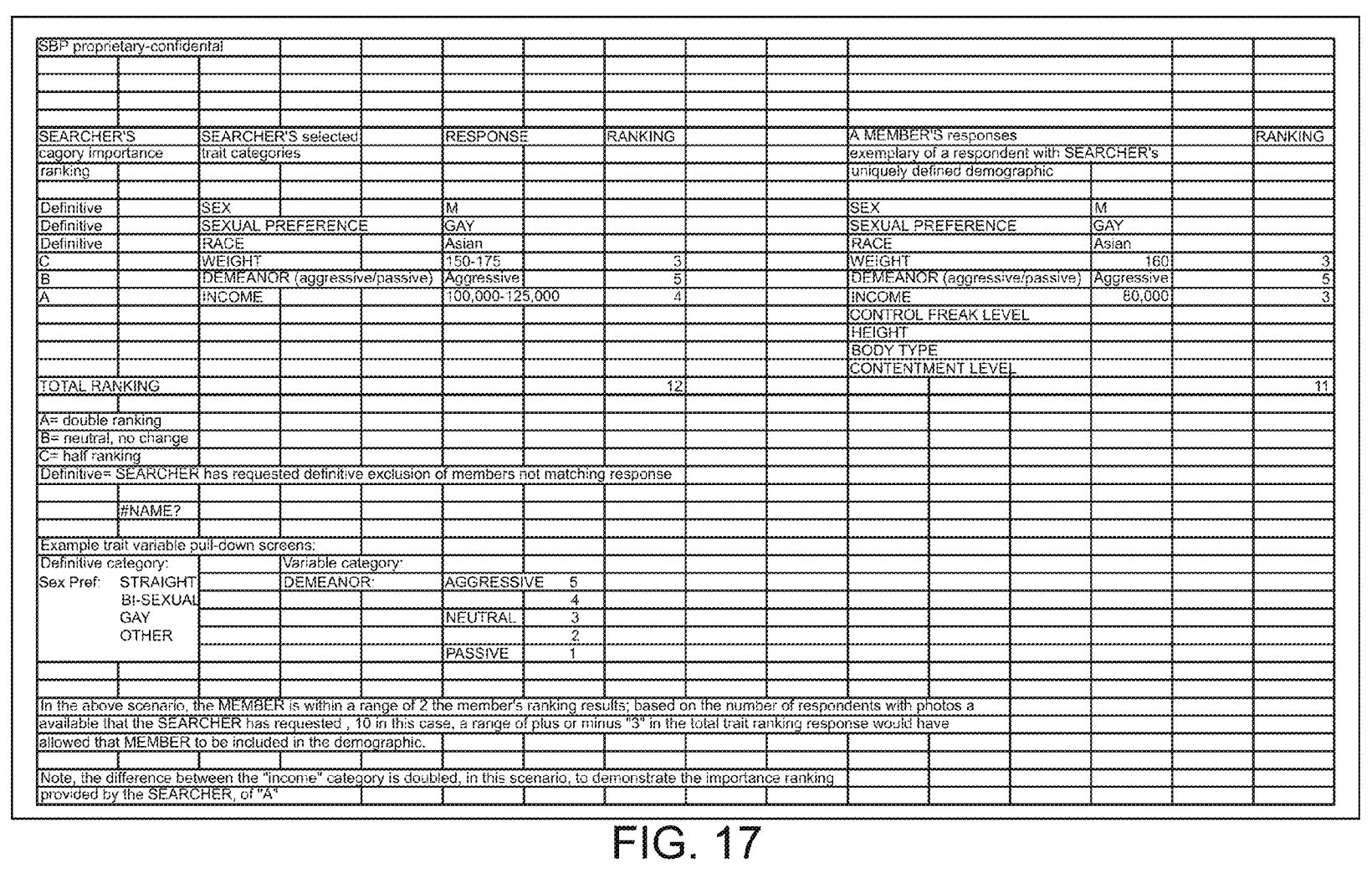

FIG. 17 demonstrates a simple correlation between and user's trait-based searching parameters in defining a demographic, and the applicable data within a member's profile, in determining relevance of this particular member to the search.

Figure 18:
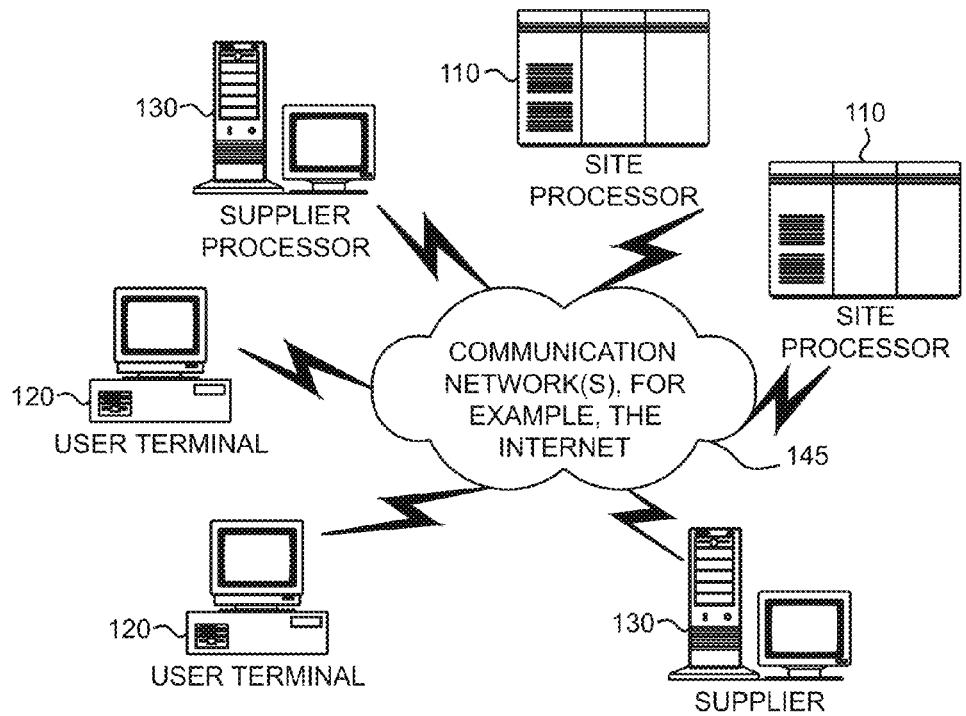

FIG. 18 illustrates one or more site processors, one or more user terminals and one or more supplier processors coupled together through a communication network in accordance with an embodiment.

Figure 19:
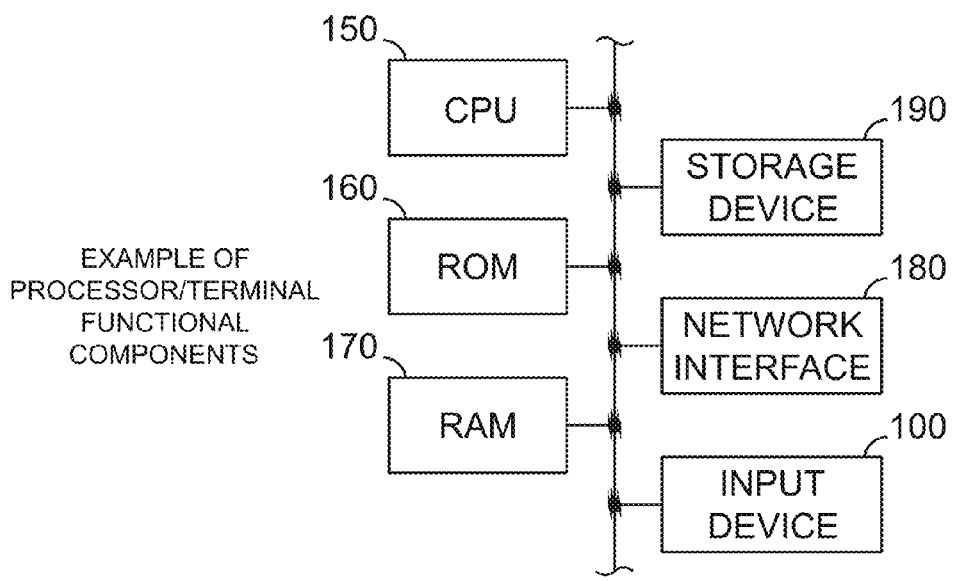

FIG. 19 illustrates functional elements of a site processor in accordance with an embodiment.

DETAILED DESCRIPTION OF EMBODIMENTS OF THE INVENTION

Please note that in the foregoing description, the term "database", when described as performing a function or correlation, includes computing means which manage the database. The computing means includes a database and a database management system which receives, sorts, compiles and stores the individual personal trait and preference data in the database into searchable records.

The system and method of the present invention provides the individual Internet user and searcher, ("user") the option of entering or identifying variables, including human traits, and other variables/aspects familiar to the "human condition," in searching for information of personal relevance. For instance, an Internet "shopper" might have curiosity about particular preferences or shopping data of other "single women a, 18 to 24 years of age, "active" in demeanor, who is a DEMOCRAT politically, earning over $100,000 per year and who has a very "optimistic" outlook or attitude." This inquiry would be entered by way of a series of keyed in or "site provided" variable options (for example, by a pull-down menu such as that shown in FIG. 6), selectively input by the shopper or user and then referenced against the available database of "MEMBERS," or people who have willingly and directly supplied personal preference data and screen names to the database in exchange for incentives, or in exchange for data they sought from the system (FIG. 2).

Figure 3:
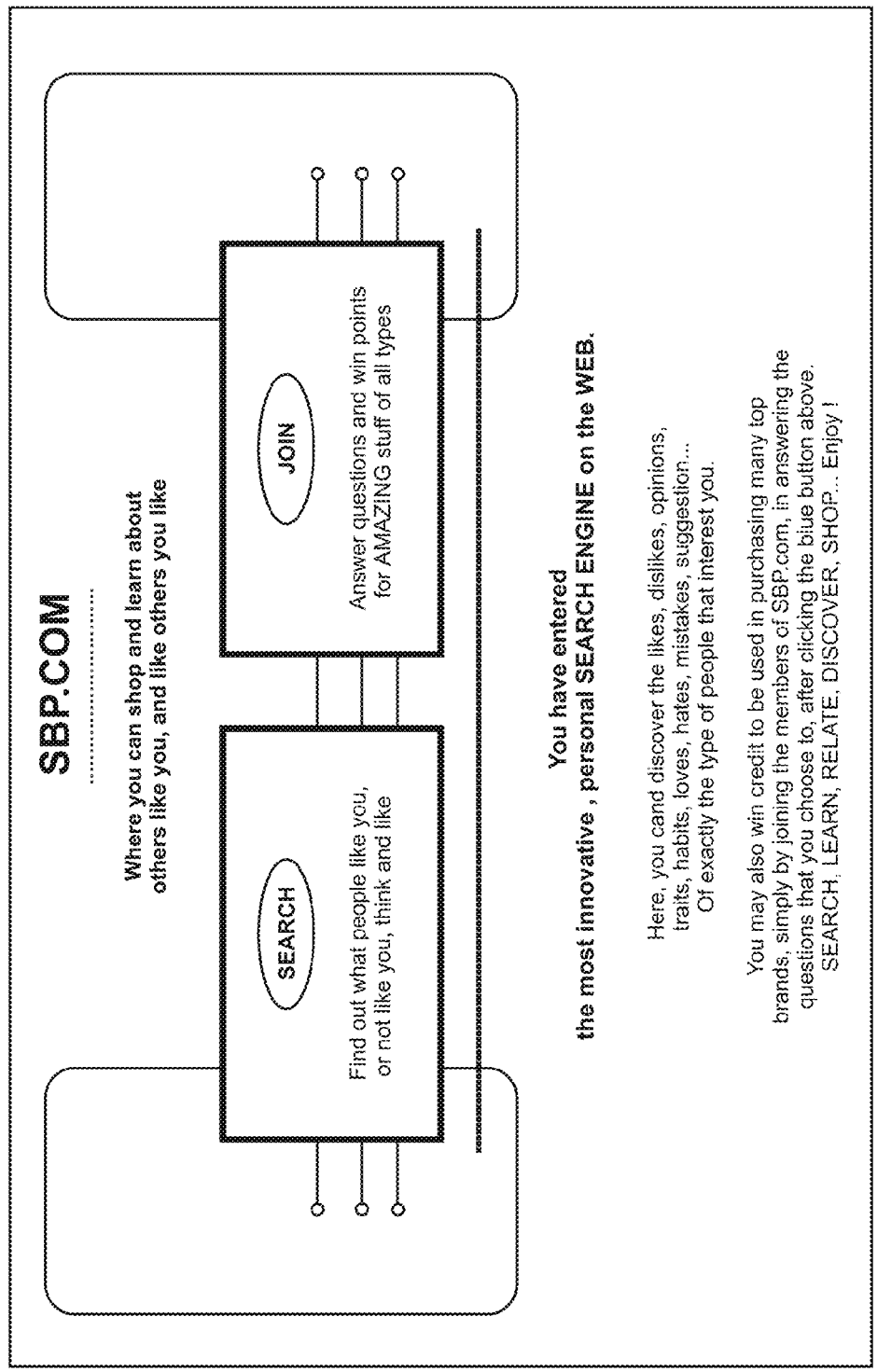

The intent of the Internet visitor may be determined when initiating interaction with sites based on the present invention (FIG. 3). On "signing in," those searching for data, and those strictly supplying a data profile to the database for direct incentives, may be discerned.

Variable options not provided to the user pre-set, as in via "pull down screens," could selectively be keyed-in by the user for selective inclusion in the "search" should this keyed-in, or otherwise supplied data variable be understood and usable by the database searching and correlation means. This "manually input" word or phrase recognition option would allow for ever-more discreet searches, allowing for correlation and similarity with members within the database to become very specific. Perhaps more importantly, when those users who are searching the database for personally relevant, human interest information about a specific type of person (though they may not be using the database to shop or purchase), may be presented during the search with a myriad of advertising and purchasing options relevant to that user's search and demographic(s) of interest, thereby providing commercial value to those SEARCHERS/database-users who are not directly "shopping".

Users may refine their demographic of choice within a search, by way of system provided options deemed to be standard options to provide to users at selected points within a search (FIG. 16.) Users may also refine their search by re-entering the demographic related trait and preference data, (FIG. 6,) preferably by re-accessing Internet site screens already accessed within the same search, for input of revised demographic parameter data.

Figure 6:
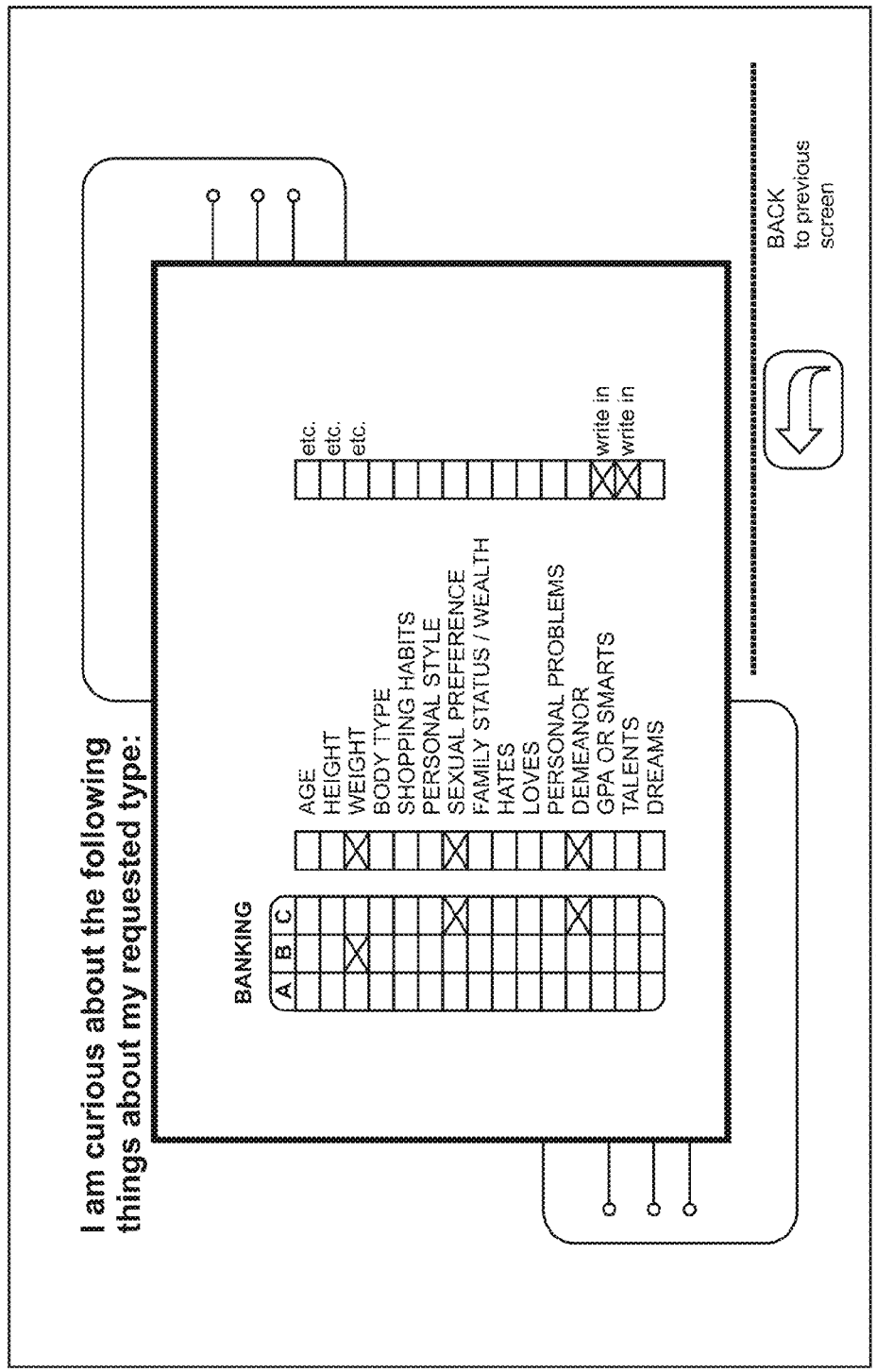

A computer and program (FIG. 17) capable of correlating values of trait and preference parameters would accommodate selectively frequent revisions of the selected group of database members relevant to a user at any particular point of their search: Revelations about selected opinions or preferences might lead a user to revise a search based on new interest in individuals who share that preference or aspect, (FIG. 12.). The database members included within a demographic may also be affected by other user-selected options, such as those affecting the scope of the group sampled, (FIG. 8.) Values assigned to the provided trait options used to "define" the initial demographic whose preferences are of interest to a user, might be affected by a variable degree of importance as selected trait might have to a user (FIG. 6.) For example, if weight is a critical aspect of the sampling, the user might select the highest importance option from several provided, giving this data more weight in the computer correlation of this variable in selecting a sampling from the database to analyze and relay to this particular user, as Internet transmitted data. A multitude of variables that a user might selectively include in a search, would mean that correlating means would include predetermined, subjective thresholds of correlation relevance for "members," (those who have data profiles within the database,) to be included in any sampling relayed to a user that reflects a group determined to be selectively similar to the user's demographic request. These predeterminations would be made by those who construct any application of the present invention, for instance, a group that might employ the present system or method in creating a TEEN Internet site, which allows young people to search data of teens based on combinations of traits defining a range of teens deemed to be of special interest to the user.

Figure 5:
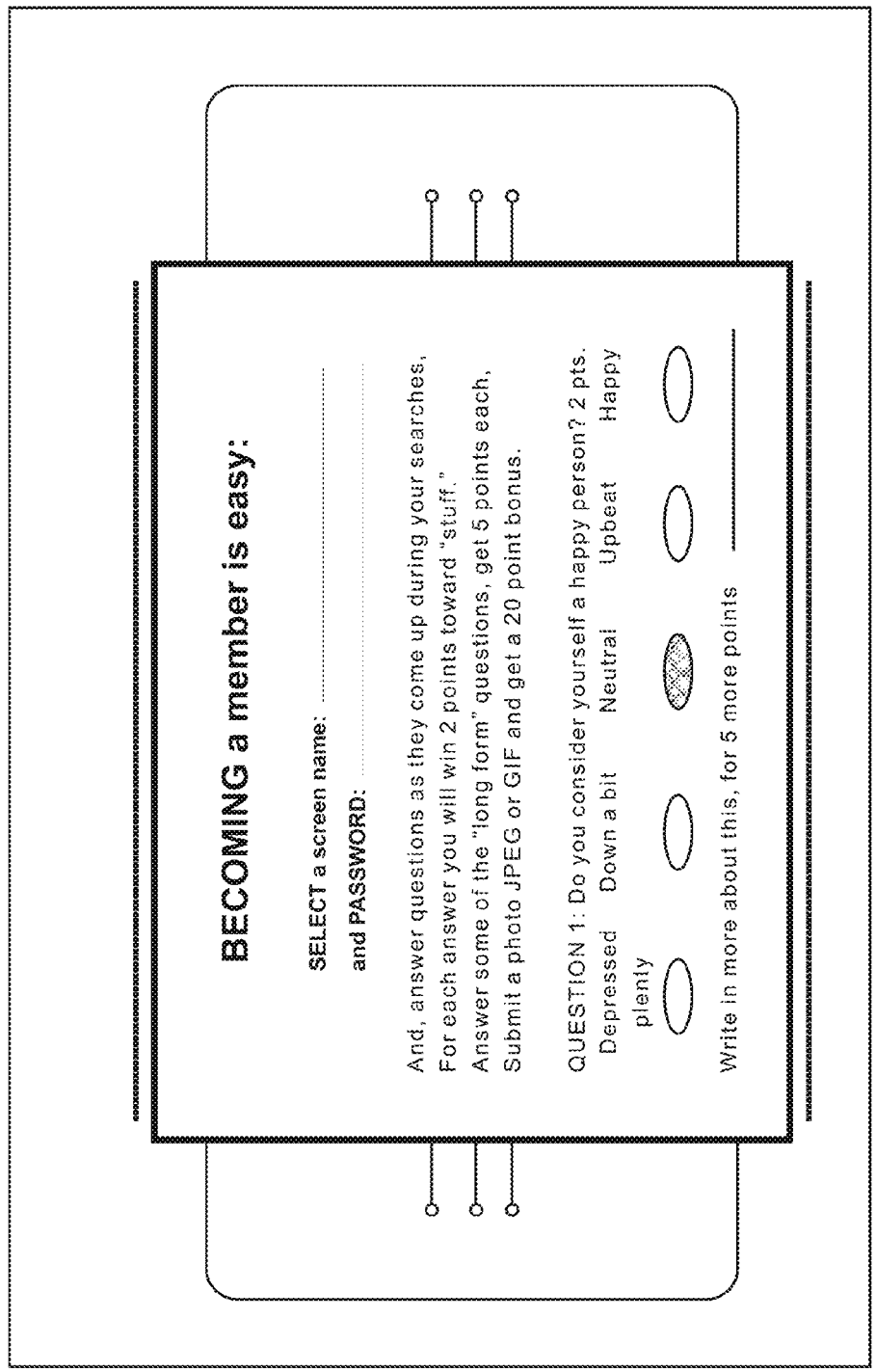

Incentives could clearly be provided to members (FIG. 2) to encourage the growth of the core database, such as direct rewards in cash or gifts, or the potential of incentive options. Incentives could be made available specifically to the user as well for "offering back" preference data, (FIG. 8) to be incorporated in to the database of the site related to the present invention—growing the database as it is used. Rewards need not be limited to these aspects though. In collecting specific personal, trait, preference and merchandise data from selected users, ever more data cataloged and recallable by users according to the traits of people and not things, may be compiled. Preferably, every user might become a member, and could be encouraged to do so (FIG. 5.)

Figure 7:
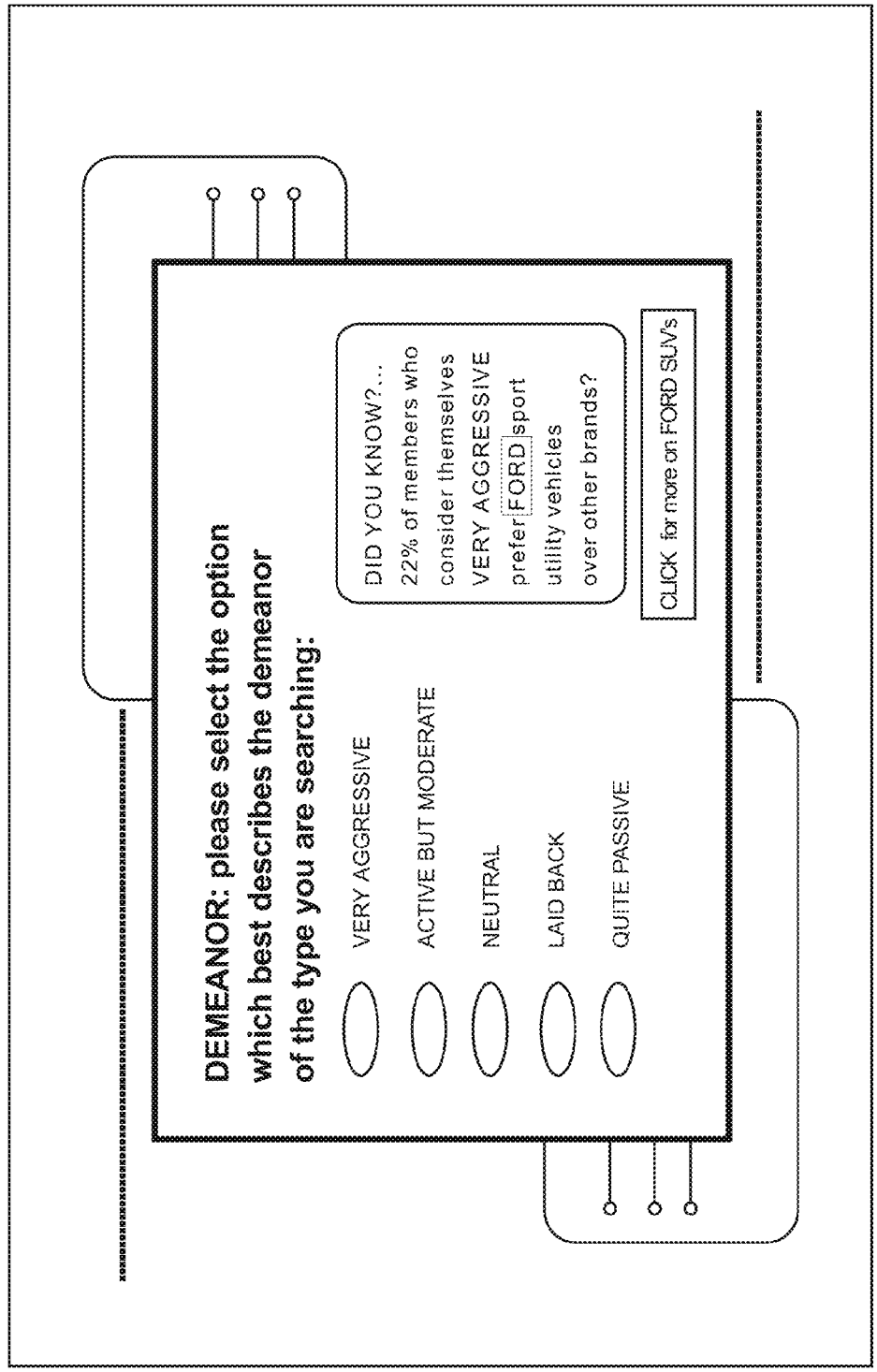

Objectives of the present invention are to provide new, discreet personal comparison means, and to provide new sources of purchasing/consumer information, by providing a forum for users to "relate" and identify with other specific types of people and consumers. Commercially, the present invention provides a "personal shopper" which is preferably unique to every user, as the personal shopper is a single, unique member of the site, or site-presented conglomeration of members fitting profiles deemed related to a user's data input and search parameters. Further, advertising may be targeted with relevance to both users/searchers, and advertisers (FIGS. 7 and 10.)

Figure 4:
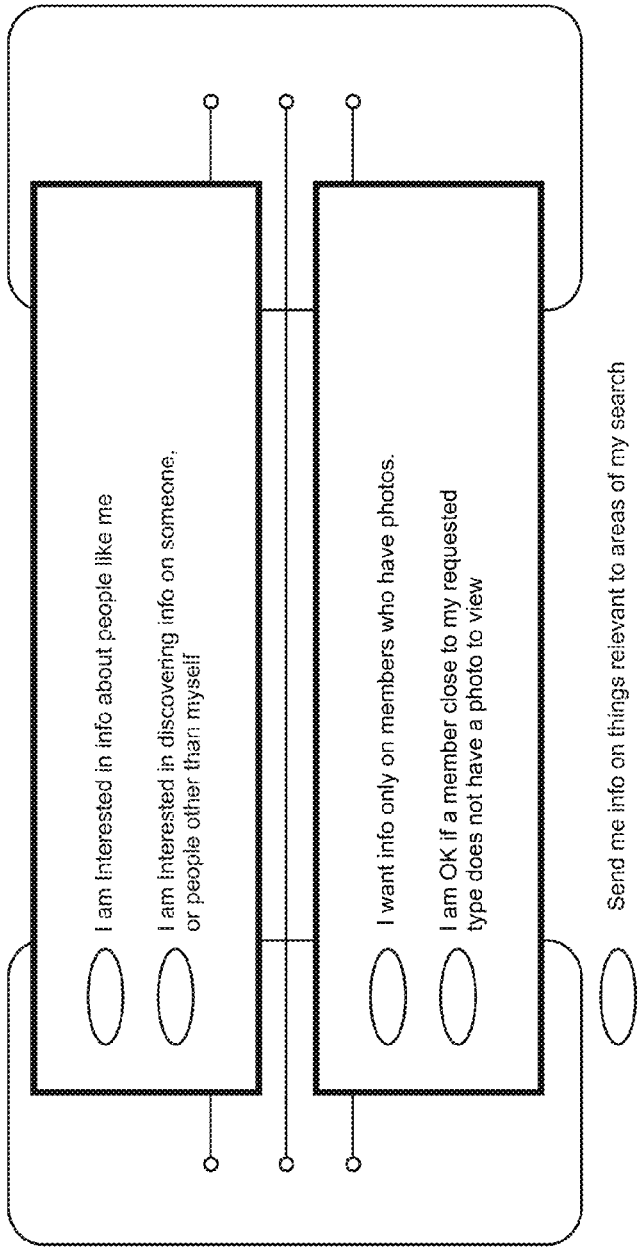

In being able to reference human trait and personality variables, people who the user/shopper may want to emulate, or not emulate, may be referenced for instance; people similar to the user may also be sampled, allowing individuals to compare learn and compare to those who may share their circumstances (FIG. 4.) This allows for unique learning about the things, places and purchasable items they have, would want and prefer. Further, searching for understanding of individuals whose preferences may be foreign to the user, such as a young woman searching for a gift for an older man, is facilitated by the present invention. Further, important personal decisions may become better informed by the "pull down screen" and long form (written) feedback (FIG. 14) from people who best relate to a user's circumstances, issues and "type" of person designated, from the overall database "membership."

Advertisers may target their information with extreme specificity to users, as the users themselves are defining the areas of demographic interest. Advertisements may occur as editorial comments, pertinent to data in the database specific to a products' or services' sampling results. These "factoids" may be calculated and relayed specifically to a single user who has met subjective system user relevance criteria to receive selected advertising data results.

Further, focus group data, or consumer preference sampling may be accomplished with immediacy and unrivaled relevance, as only users and members of selected relevance to the data solicitation might be contacted (FIG. 11.5.) Accordingly, discreet trait and preference specific groups of individuals that would be virtually impossible to locate and sample with typical focus group approaches are capable of being located and sampled with the present system. For example, a movie company might give a "bio" of a new film, and submit a question that the system would relay only to users who are women between 18 and 24 who show a particular interest in fashion and beauty, the question being: "Which of the following actresses would be most likely to get you in to the theatre, should they play this role in this movie?" A write in option could naturally also be provided, for unsupplied response options. The result being, firms in every industry can solicit focus group information from remarkably targeted, and immediately accessible consumers.

The present invention provides a new level of Internet options and service, based more on a "thinking" model than a "factual" model, where absolutes are not what is sought by users but information found between who the user is (or the "type" of person they are shopping or researching about,) and who those profiled in the database are, and what and how they choose in the context of how they feel, look and behave. This invention is a "human search engine" of the Internet, and a database that allows the user, or SEARCHER, to search human preferences and feedback, based on human traits and parameter options. Further, this invention provides the internet user the proactive control over sampling, instead of the familiar approach of the Internet world to passively sample Internet users based on their general activity on the web, such as what sites they visit frequently, etc. This is a slow and inefficient means to learn from users who are able to proactively provide discreet data about themselves, by seeking discreet data for their personal needs and reference. This is the function of the present invention.

In a preferred configuration, the "micro-demographic" of the USER or searcher, is first determined through a trait-based selection process, (FIG. 6) wherein selected definitive and variable traits are selected and ranked by the user by relevance and importance to that user's search. The scope of the database similar to the parameters might be user defined then, based on system-supplied options (FIG. 8.) Secondarily, the "preference" options of interest to that user (FIG. 9) are provided, to allow for very discreet areas of feedback to be compared about and within the users identified "trait based micro-demographic" of interest. In navigating a user's selected group's, or demographic's, preferences and feedback, options for continual "refinement" of the demographic being searched are selectively provided to "tailor" the group being studied to user priorities as they may change during a single search.

Typical shopping means on the Internet currently include searches by product or service type, searches by brand name, and personal shopper assistance from a "helper" that is not necessarily defined by the user, unlike the present invention. By sharing preferences, opinions and personal observations about self and others in the context of purchasable items and general human interest information, a venue not only for newly informed purchasing is created, but a forum for support, gift ideas, self-improvement and broader awareness of others among other results is also created. For instance, an overweight person embodying certain specific insecurities and physical circumstances, might find new ideas of what to wear to address appearance concerns by referencing people with similar circumstances, and their recommendations, observations and preferences.

That same person might learn how other similar "overweight people" deal with people who react negatively to "overweight" people; or how "thin" people feel about their own appearances, and the appearances of people the consider to be "overweight." Further, a new business woman with specific physical and emotional traits, unsure of what to wear on the job might find her best recommendations from business women whose feedback and selections educate her to ways to advantage her in the new circumstance, from those who have already experienced it. And, a young woman wondering whether to date a certain man can reference personal feedback from both women like herself and men she deems to be similar to her potential date, for broader awareness of both perspectives in decision making; whether data is product and service related, or simply selected personal and emotional feedback.

Perhaps more importantly, that person may have entered in to a search with "weight issues" on their mind initially, and ended up focusing on people who share a common travel interest, as an exciting range of featured preferences and opinions of members, or profiles, may be revelations that steer a user in to new areas of interest, increasing commercial versatility and reach of the invention for advertisers.

A vital aspect of the invention is the fact that the "MEMBERS" or those people who have belong to the database of the present invention, having willingly, directly and proactively supplied data about themselves to the database. By prompting SEARCHERS to "join," discreetly or with incentives, or with the requirement to answer selected relevant questions in order to further use the database, or to go to a deeper level in the database (such as to review long form, written feedback from members,) the database of the present invention can be virtually "self feeding" for information. Further, as the SEARCHER or user is seeking true information, it is unlikely they will lie or deceive in supplying data to the database, as their mind-set, or "mode" will be truthful and to think to supply deceptive data while searching what they anticipate is true data, is unlikely.

The additional option of still images and video (FIGS. 7 and 8) may be provided by members as further personal "data" compiled within the database is important. In being able to review still or motion visual content, or photos, or selected real people who have provided these images to the venue or site (perhaps in exchange for selected rewards,) the shopper/user can identify further those people of interest and those other consumers who's choices are of interest and relevance to the shopper/user in determining their own choices. In being able to reference as broad or as narrow a category of people to review, (those "most similar to the search parameters" for instance,) very discreet and emotionally based choices can be made by way of the options of the present invention, tapping in to variables more closely associated with self esteem, role model emulation and personal aspects of featured people. Searches may include several "rounds" or refinements, wherein a final stage of selection by a user in creating their micro-demographic of interest may include reviewing available photos, or responses in manually input fields, for more specific member selection (FIGS. 12 and 16). The option of excluding members (FIG. 8) who do not have photos available is selectively an option, to maintain interest for more visual searchers/users.

On selecting a single member to review, including long-form feedback available (FIG. 14), a search might be broadened from "self esteem" issues for example, to "car preferences," wherein the searcher can broaden the scope of the search at that point to sample his entire group (or originally designated trait-based micro-demographic), to review their overall preferences on the new topic by percentage (FIG. 16). This option demonstrates the selectable versatility of searches of databases of the present invention, as the choice to reference "car preferences" was prompted by the profile/feedback screen of a single member, who was referenced by the searcher/user based on an entirely separate area, or motivation, of interest/curiosity.

Options in reviewing response data, specific to products and services for instance, may include a correlation of both product "types" and brands and/or styles within the selected micro-demographic identified by a user. For instance, within the trait data a user has input, 50 members constitute the top 1% of members most closely related to the user's selections. The user is interested in seeing what cars his selected micro-demographic prefers (FIG. 15.)

The database is referenced by the site in response to the user's search, and the search result provided to the user confirms that 10 of the 50 members in the 1% correlation group prefer SPORT UTILITY VEHICLES; on requesting brand preference, the user is supplied with the information that 5 of those 10, or half, prefer the FORD EXPLORER, 2 of those 5 own a FORD EXPLORER, and 4 of the 10 prefer the color BLACK in a SPORT UTILITY VEHICLE. In another search, a user may determine that he wants to use the top 100 members closest to his search parameters: of these members, the user is curious what watches the group owns; the site search of the database determines that the user-selected micro-demographic includes 92 members that own watches, of them the top brand is ROLEX, of which 24% of the demographic owns, 35% of that 24% (who own Rolex's) own a PRESIDENTIAL model in Gold. In a more general search regarding watches, the user also learns that his uniquely created demographic prefers SPORT watches (52%) over any other category "type" of watch. "Long form data" review of a selected member (due to interest in her photo,) within the trait-group reveals to the searcher that this member of special interest to him/her is feels that "people with gold watches are often unfaithful to their spouses."

Such multi-leveled searches may be configured according to percentage of respondents meeting a selected degree of correlation with a user's input search data, (FIG. 17,) or a selected number of members coming closest to matching said user's data, or "bin" of members built by a user from his own personal criteria (unrelated to database means for correlation.) The means and options for correlation and member micro-demographic selection by a site referencing the database, or by a user, is virtually infinite, much the way the entire database of the internet may be referenced and cross-referenced in a multitude of ways, by way of search engines that approach the task in a variety of different ways.

The consumer preference data collected by this site would be of considerable value to many, as the discreet categories of traits and personal profile aspects could be as narrow as desired by those operating site(s) and venues utilizing the options provided by this invention. Far more detailed than just age and "who bought what where" data, the present invention takes demographic data to an entirely new level. Specific, relevant questions may selectively be "purchased" by firms needing feedback from the unique preference and/or trait-based demographics provided by databases of the present invention.

The present invention could further involve data to be provided based on sub "categories" determined directly by users/shoppers, by way of a key-in means, allowing for unlimited options to be relayed from users, for selected processing and categorizing based on correlation between data related to trait and human aspect categories offered directly by users, not having been yet made available as a "pull down" or on-screen icon option. A demographic might even be identified by user's by requesting members who identified a new sub-category manually, that had not been presented within supplied (pull down menu) options, for instance (FIG. 6).

Further, the present invention could provide options including selected processing of the data from users/shoppers, including the option of people (specifically provided to review the database,) reviewing and categorizing data from respondents according to parameters relevant to the site needs, or venue needs, to define selected data-groupings of member feedback. In other words, human involvement in reviewing more complex data from members might provide additional sectors of information within the database that might not have been categorized or included as they may have required human interpretation to be placed subjectively in to a searchable bin, or data category.

A virtually infinite number of "micro-demographics" can be created and made available for users to reference, with selected "narrowness of focus" in pin pointing groups and types of people; it is possible that no two users may ever identify the same demographic in a search.

One very important aspect of the present invention is that application options based on this invention might allow for direct shopping, or items actually purchased by way of site(s) featuring options created by this invention, or such site(s) might refer users/shoppers to other sites via links, once preferences have been identified that have a corresponding site for more information and in some cases sites for transacting purchases of items displayed in accordance with searches by trait conducted by way of the method and system of the present invention. Links back to a site such as one(s) created based on the present art, could be made from vendors including in links from such site(s) based on this art, increasing the user base and providing a research and information service to consumers made available by the links from other sites. Listing brands as options and suggestions in both searcher and member pull-down screen options, (FIG. 15) is saleable to advertisers and brands to be "out of site" is "out of mind," so the desire to be included in the database results could be very strong for advertisers; links to their sites or purchasing means is secondarily a potentially saleable option as well (FIGS. 7, 10 and 15.) In identifying special and perhaps unusual personal areas of interest, uniquely targeted and formatted advertising opportunities may be created.

The present invention may provide a selectively "pure" database that in no way is biased toward any selected options or brands, or the database may allow for all possible selections, but provide greater visibility and promotion of selected brands within user selected categories. Naturally, should the scenario be the latter, keyed-in options that may not be a brand that is specially featured, may provide search options listing brands or options that were not within site-supplied names; in this scenario, such a brand or name could be listed in the results, showing the degree of correlation; though, the inclusion of a link to that brand or supplier's own site, or the provision of direct shopping means of their items, or inclusion within pull down menus (due to a brand or name's popularity with members,) is at the option of the database owner (FIG. 15.) Having said that, the option of selling products and services, or providing other referral and information services directly to users and members is possible, is an aspect of the present invention, and is also an option of the database owner, or owner of the site/searching means of a database based on the present invention.

The options of the present invention could be featured as the primary and independent searching means in selected site(s) involving the methods or system herein, though they could also be incorporated as aspects of a conventional, existing or familiar e-commerce site, providing additional referencing latitude to the shopping and/or utilization of said site(s.) Thus, shopping could be done by product in the familiar ways, such as by product category, and by way of the special trait and human profiling and characteristics the user selected/created micro-demographic referencing method of the present invention provides.

The application of sites that access a database based on the present invention also includes a myriad of options. For instance, a publishing company that owns several magazine titles, may have such a site. In this scenario, promotions within their magazines might draw consumers to the site, to become members and to provide core data to the database; those new members might receive selectively large incentives, whether gifts or winning potential, based on the amount of data input, meaning that selectively a member who supplies a photo or video of himself would qualify for more reward. Such a publisher might provide SELECTED brands or clients within pull down screen (site presented) options to users, as the owner of the site would have control over the categories of trait and preference data members and users receive as prompts from the site.

Further, the brands listed within commercially based options and pull-down menus, might include brands that are paying to be listed, or brands that are qualifying to be listed as determined by the publisher. Meaning, the value of controlling such a database for a firm such as a publishing company, includes the ability to provide incentives to advertisers (or selected companies,) to be included in lists that would make their brand, product or service a visible option to members and users, increasing the likelihood of their brand and product being listed and referenced in searches by users.

Further, selected brands meeting criteria determined by the publisher in this case, (or owner of the database in a broader sense,) may have their brand or name listed in bold and featuring a direct LINK to their own site, meaning that the site based on the present invention could potentially draw clients and buyers directly to selected brands' information and/or e-commerce sites, at the user's option. Further, members and/or users who input selections specific to brands meeting criteria of the database owner, may be prompted to allow for materials or other solicitations to be sent to them by selected brands, or product/service providers. Whether cooped with a publisher, a separate conventional search engine, or other property including e-commerce sites, configurations of the present invention for Internet application are many.

Enormously valuable ADVERTISING means are created that transcend existing Internet advertising options, as the present invention targets the messages with not only demographic specificity, but content and topic relevance to each individual user, or searcher. The option of search-relevant FACTOIDS which includes advertising as an aspect of a statistic from the database relevant to the searcher, relevance being a option determined by the database configuration, could provide new interest around advertising messages—each message seemingly personally created and recalled for each searcher/user. These advertising options and values are demonstrated in an example SEARCH in the SCREEN diagrams enclosed. Beyond the ability to target searchers, the ability to connect with members by posting and email means, are powerful:

This area of SERVICE to users and advertisers involves uniquely targeted EMAIL (FIGS. 9, 11 and 13,) messages usable by users or searchers and selectively by advertisers. The option of uniquely assembled, individual user-relevant posting boards (FIG. 9.) As each searcher/user identifies traits and preferences of relevance to their search, a constantly refined group of "most relevant" members to that search is assembled, and revised. With the option of "group e-mail" and group posting boards, messages may be sent by searchers/users selectively to members relevant to a particular phase of their search, to gain the most useful or relevant feedback from the membership. For example, a searcher may want to pose a question to the top ten relevant members who are within their trait-based demographic group, who are diabetic, or who feel FRANK SINATRA was the best male singer ever.

Message postings could appear in unique combinations, by topic or member relevance, as a searcher/user accesses boards. Should a searcher find a preference based topic to be the priority, the potential of posting or reviewing boards related to the topic from the entire database membership is an example of versatility in searching the preferred configuration of sites based on the present invention should embody. Naturally handpicked members could be sent messages selectively, as a function of a closed e-mail system within a service site involving the database of the present invention. Advertisers included based on their demographic desires and selectively by their relevance to a given search, may email and post to their "dream demographics," and likely have their advertising received by the audience with interest and willingness to read and "link." This, because the interest level and relevance to that member was predetermined to be above a selected level, or threshold, by parameters selectively determined as the construct of the database's categorization.

Further disclosure is included in the following presentation style "snapshot" of the invention as used in a configuration, called "SHOP BY PROFILE", including a series of screen examples that demonstrate some of the options a SEARCHER might encounter while searching for preference information about a selected "type" of people who he/she has defined by selected trait variables, input by the SEARCHER. The SCREEN diagrams, which demonstrate an application of the present invention, are described in the following, in a scenario that encounters and details many of the options for configuration based on the system and method of the present invention, including the versatility and value of the searchable database options, and the advertising and revenue potential of an Internet site configured from aspects of the present invention.

The nature of the present invention is such that one skilled in the art of writing computer executable code (software), will be able to implement the described functions using one or a combination of popular computer programming languages such as "C++", Visual Basic, Java or HTML and/or web application development environments. As discussed above, one of the functions performed by the system is operation as a web site.

A web site typically communicates with web browsers using the hypertext transfer protocol (HTTP) to send and receive data including hypertext mark-up language (HTML) web page data and executable JAVA Applets. Of course, any known data transfer protocol and web site configuration/definition language can be used to implement the present system as shown in the accompanying figures.

Although the present invention is described by way of example herein in terms of a web based system using web browsers and a site processors, the system is not limited to that particular configuration. It is contemplated that the system can be arranged such that user terminals can communicate with, and display data received from the system using any known communication and display method, for example, using a non-Internet browser WINDOWS viewer coupled with local area network protocol such as Internetwork Packet Exchange (IPX).

As shown in FIG. 18, the system in accordance with the present invention includes one or more site processors 110, one or more user terminals 120 and one or more supplier processors 130 coupled together through communication network 145.

Although shown as a single communication network, communication network 145 can be comprised of multiple interconnected networks, for example the Internet. As such, communication network 145 can be any communication network, but is typically the Internet or some other global computer network. Communications between the elements of the present system can be implemented using any known arrangements for accessing the communication network 145, such as dial-up serial line interface protocol/point-to-point protocol (SLIP/PPP), Integrated Services Digital Network (ISDN), dedicated leased-line services, broadband (cable) access, frame relay, Digital Subscriber Line (DSL), asynchronous transfer mode (ATM) or other access techniques.

The user terminals 120 have the ability to send and receive data across communication network 145, and the ability to display the received data on a display device using appropriate communication software such as an Internet web browser. By way of example, terminal 120 may be a personal computer such as an INTEL PENTIUM-based computer or an APPLE MACINTOSH computer, but is not limited to such. Other such terminals which can communicate using a global computer network such as palm top computers, personal digital assistants (PDAs) and mass-marketed Internet access devices, i.e., WEB TV, can be used.

Accordingly the user terminals 120 provide access to the site processor 110 for the purpose of accessing the electronic architecture (database and database management system) of the present invention. The system software which controls the above-described functions relies primarily on the one or more site processors 110. Site processors 110 typically communicate with network 145 across a permanent i.e., unswitched, communication link. Permanent connectivity ensures that access to server 110 is always available to terminals 120.

Site processors 110 can be any appropriately sized computing platform, the storage, processing and other functional capacities of which are determined based on expected user activity and data storage requirements. For example, site processors 110 can be server-type personal computers, minicomputers such as UNIX-based servers, and even mainframe computers.

Supply processors 130 are preferably owned and maintained by the entities of supplying goods and services for marketing. Supply processors 130 are preferably used for receiving demographics, marketing and sales data from site processors 110 and for providing corporate, product and service and other relevant information to site processors 110, terminals 120 and LIVE SHOW processors 140. Further, orders for goods and services placed by users via user/player terminal 120 can be accepted directly from user terminals 120 or via site processors 110.

As shown in FIG. 19, the functional elements of each site processor 110 preferably include a central processing unit (CPU) 150 used to execute software code in order to control the operation of the server, read only memory (ROM) 160, random access memory (RAM) 170, at least one network interface 180 to transmit and receive data to and from other computer devices across communication network 145, storage devices 190 such as a hard disk drive, floppy disk drive, tape drive, CD-ROM, DVD-ROM and the like for storing program code, databases and application data, and one or more input devices 100, such as a keyboard and mouse.

The various components of site processor 110 need not be physically contained within the same chassis or even be located in a single location. For example, the database on storage device 190 may be located at a site which is remote from the remaining elements of site processor 110, and may even be connected to CPU 150 across communication network 145 via network interface 180.

Terminals 120 and supply processors 130 are preferably comprised of the same or subset of the functional components described with respect to the site processors 110. Of course, the functional components of these devices are sized to accommodate capacities appropriate for their usage. For example, terminals 120 may include more sophisticated displays and display driving hardware than the other elements, but may contain a smaller storage device, and less powerful CPU 150 than the other components. Also, supplier processor 130 may contain a more powerful CPU 150 than site processor 110, especially in the case where supplier processor 130 is implemented by a large corporation with a sophisticated Internet presence.

Thus, and in accordance with the teachings herein, Revenue can be derived from entirely new forms of ADVERTISING and DATA SOLICITATION. FACTOIDS & LINKING OPTIONS, BRAND OPTION SUGGESTION LISTS; CLOSED EMAIL and POSTING BOARD advertisements; PAID, SPECIFIC DATA SOLICITATIONS (special questions) are based on SEARCHER content-relevant scenarios only, maintaining THRESHOLDS OF RELEVANCE before such "advertising" can even appear or be featured within a given SEARCH. This will limit the number of people solicited, but vastly increase the QUALITY of the audience, SCREEN TIME spent generally and on each ADVERTISEMENT, and Likelihood of LINKING or further brand/category data comparisons by SEARCHER. Moreover, CATEGORY-RELEVANT questions keep data solicitations relevant and not jarring, which appear to be an element of the data-narrowing process for the SEARCHER.

Further, the database becomes more refined and valuable with each day of use, growing the overall sampling group and depth of feedback on file for each member (e.g., their profile). LEVELS of specificity for targeting may in fact dictate the cost of mailing such MEMBERS.

Further, FEES may be charged for brands to be "multi-listed" or programmed to appear when a MEMBER or SEARCHER references "suggestion" screens which may list options to consider in supplying accurate preference data. For instance, under FAVORITE LUXURY GOODS, if this is a preference category listed, HERMES, GUCCI and FENDI might pay to be listed within the supplied "suggested" options. Or, they might be listed with links or other benefits while brands not paying to be listed, may simply have their name offered as an option.

SEARCHERS may not only reference data on members, but also send EMAIL within the closed system of the site to those within a selected "customized" searcher demographic. This mail may be selectively sent to just to one identified member within their selected group, all members, or just members within the group who meet a secondary level of selected preference criteria, such as those in a custom demographic who select the same recording artist as one of their top 3 favorites, for example. In this way, very specific questions, issues and requests from a SEARCHER may be received by those who have a high likelihood of "relating" or being able to reply with relevant responses for the SEARCHER.

Further, message boards may provide posting means for MEMBERS, and SEARCHERS can reference only those messages on the boards from a selected number, or percentage of MEMBERS based on similarity to the SEARCHER trait and/or preference data input during a SEARCH.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:
1. A method comprising:
accessing at least one database on one or more processor readable media, by one or more processors, the at least one database comprising:
electronic user information including at least one from a group consisting of a trait, a brand-specific preference, and a person-specific identifier of each of a plurality of persons; and
electronic advertiser information comprising information associated with at least one branded product and/or service associated with at least one respective advertiser of a plurality of advertisers;
receiving, via one or more communication devices that are operatively connected to the one or more processors, first electronic information from a first user computing device associated with a first user, wherein the first electronic information includes at least some user information associated with the first user and information representing at least a trait, a preference, and/or a person-specific identifier;
defining, by the one or more processors and in accordance with the first electronic information, a first group of at least two respective persons of the plurality of persons, wherein the first group is custom to the first user;
determining, by the one or more processors and in accordance with at least a relationship of at least some user information associated with the first user and the electronic advertiser information, a relevance of the first user to at least two advertisers of the plurality of advertisers;

processing, by the one or more processors, to identify one respective person of the first group in accordance with information representing a previously received selection of the one respective person by the first user;

selecting, by the one or more processors, one of the at least two advertisers based at least on a relevance of the one respective person of the first group to at least some of the user information representing at least one person's preference of a brand associated with the one of the at least two advertisers;

generating, by the one or more processors, advertising information that includes the brand associated with the one of the at least two advertisers, and a person-specific identifier associated with the one respective person of the first group; and transmitting, via the one or more communication devices, by the one or more processors, at least some of the advertising information to the first user computing device.

2. The method of claim 1, wherein the processing to identify one respective person of the first group is further in accordance with at least some electronic advertiser information.

3. The method of claim 1, wherein the determining the relevance of the first user to at least two advertisers of the plurality of advertisers is further in accordance with at least one of advertiser targeting priorities.

4. The method of claim 1, wherein the processing to identify one respective person of the first group is further in accordance with selecting, by the one or more processors, in accordance with at least the relevance of the first user to at least two advertisers of the plurality of advertisers, at least some of the electronic user information associated with one or more person of the plurality of persons.

5. The method of claim 1, further comprising:
determining, by the one or more processors, a likelihood of receiving additional electronic information from the first user computing device;
generating, by the one or more processors, based on at least the determining the likelihood of receiving the additional electronic information from the first user computing device, second advertising information comprising electronic user interest information associated with at least one of the plurality of persons; and
transmitting, via the one or more communication devices, by the one or more processors, the second advertising information to the first user computing device.

6. The method of claim 1, wherein the first electronic information further includes an indication of a purchase of one or more of the at least one of the one or more of branded products and services.

7. The method of claim 1, wherein the first electronic information is at least one from a group consisting of: a trait and a preference of the first user.

8. The method of claim 1, wherein the first electronic information from the first user computing device is a submission of at least one from a group consisting of: a trait and a preference of a person other than the first user.

9. The method of claim 1, further comprising:
selecting, by the one or more processors, at least some other electronic advertiser information from the electronic advertiser information and in accordance with at least the relevance of the first user to at least two advertisers of the plurality of advertisers; and
transmitting, via the one or more communication devices by the one or more processors, the at least some other advertiser information prior to transmitting the at least some of the advertising information to the first user computing device.

10. The method of claim 1, further comprising:
storing the first electronic information received from the first user computing device in the at least one database.

11. The method of claim 1, wherein the first electronic user interest information includes a question regarding one or more of human emotional information and human behavioral information.

12. The method of claim 1, further comprising
storing in the at least one database electronic identification information comprising at least one of visual and audio information respectively relating to at least one of the plurality of persons, and further comprising:
selecting, by the one or more processors and in accordance with at least the relevance of the first user to at least two advertisers of the plurality of advertisers, at least some of the electronic identification information relating to at least one of the at least one of the plurality of users; and
transmitting to the first user computing device, via the one or more communication devices by the one or more processors, the at least some of the electronic identification information.

13. The method of claim 12, further comprising:
receiving from the first user computing device, via the one or more communication devices that are operatively connected to the one or more processors, electronic message information relating to the at least one of the at least one of the plurality of persons.

14. The method of claim 12, wherein the selecting the at least some of the electronic identification information is further based on at least the at least some electronic advertiser information.

15. The method of claim 12, wherein the selecting the at least some of the electronic identification information is further based on at least the first electronic user interest information.

16. The method of claim 5, wherein the determining the likelihood of receiving additional electronic information from the first user computing device is based on at least at least one relevance factor.

17. The method of claim 1, further comprising receiving, by the one or more processors from the first user computing device, a selection of the respective person of the at least two respective persons, and further wherein the determining the one respective person is in accordance with the selection.

18. A system comprising:
one or more processor readable media;
one or more processors operatively coupled to the one or more processor readable media;
at least one database stored on the one or more processor readable media, the at least one database comprising:
electronic user information including at least one from a group consisting of a trait, a brand-specific preference, and a person-specific identifier of each of a plurality of persons; and
electronic advertiser information comprising information associated with at least one branded product and/or service associated with at least one respective advertiser of a plurality of advertisers;
the one or more processor readable media having instructions for causing the following steps to be performed by the one or more processors:
receiving, via one or more communication devices that are operatively connected to the one or more processors, first electronic information from a first user computing device associated with a first user, wherein the first electronic information includes at least some user information associated with the first user and information representing at least a trait, a preference, and/or a person-specific identifier;

defining, by the one or more processors and in accordance with the first electronic information, a first group of at least two respective persons of the plurality of persons, wherein the first group is custom to the first user;

determining, by the one or more processors and in accordance with at least a relationship of at least some user information associated with the first user and the electronic advertiser information, a relevance of the first user to at least two advertisers of the plurality of advertisers;

processing, by the one or more processors, to identify one respective person of the first group in accordance with information representing a previously received selection of the one respective person by the first user;

selecting, by the one or more processors, one of the at least two advertisers based at least on a relevance of the one respective person of the first group to at least some of the user information representing at least one person's preference of a brand associated with the one of the at least two advertisers;

generating, by the one or more processors, advertising information that includes the brand associated with the one of the at least two advertisers, and a person-specific identifier associated with the one respective person of the first group; and transmitting, via the one or more communication devices, by the one or more processors, at least some of the advertising information to the first user computing device.

19. The system of claim 18, wherein the one or more processor readable media further have instructions for causing the following steps to be performed by the one or more processors:

determining a likelihood of receiving additional electronic information from the first user computing device;

generating, based on at least the determining the likelihood of receiving the additional electronic information from the first user computing device, second-advertising information comprising electronic user interest information associated with at least one of the plurality of persons; and transmitting, via the one or more communication, the second advertising information to the first user computing device.

20. The system of claim 19, wherein the determining the likelihood of receiving additional electronic information from the first user computing device is in accordance with at least the relevance of the first user to at least two advertisers of the plurality of advertisers.

21. The system of claim 18, wherein the determining the one respective person of the at least two respective persons is in accordance with at least some electronic advertiser information.

* * * * *

UNITED STATES PATENT AND TRADEMARK OFFICE
CERTIFICATE OF CORRECTION

PATENT NO. : 8,990,102 B1
APPLICATION NO. : 12/791564
DATED : March 24, 2015
INVENTOR(S) : Craig Mowry Page 1 of 1

It is certified that error appears in the above-identified patent and that said Letters Patent is hereby corrected as shown below:

In the Specification,

Column 10, line 26, the text "(FIG. 11.5.)" should be "(FIG. 11B)."

Signed and Sealed this
Thirtieth Day of June, 2015

Michelle K. Lee
*Director of the United States Patent and Trademark Office*